United States Patent
Zhang et al.

(10) Patent No.: US 11,653,404 B2
(45) Date of Patent: May 16, 2023

(54) INFORMATION INDICATION METHOD AND APPARATUS

(71) Applicant: HUAWEI TECHNOLOGIES CO., LTD., Guangdong (CN)

(72) Inventors: Di Zhang, Beijing (CN); Kunpeng Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 159 days.

(21) Appl. No.: 16/786,740

(22) Filed: Feb. 10, 2020

(65) Prior Publication Data

US 2020/0178341 A1    Jun. 4, 2020

Related U.S. Application Data

(63) Continuation of application No. PCT/CN2018/099884, filed on Aug. 10, 2018.

(30) Foreign Application Priority Data

Aug. 11, 2017  (CN) .......................... 201710687960.3
Oct. 13, 2017  (CN) .......................... 201710954653.7

(51) Int. Cl.
*H04W 76/19*       (2018.01)
*H04L 5/00*        (2006.01)
(Continued)

(52) U.S. Cl.
CPC ........... *H04W 76/19* (2018.02); *H04L 5/0055* (2013.01); *H04L 5/0057* (2013.01); *H04W 28/04* (2013.01); *H04W 72/0413* (2013.01)

(58) Field of Classification Search
CPC ................ H04W 76/19; H04W 28/04; H04W 72/0413; H04L 5/0055; H04L 5/0057
See application file for complete search history.

(56) References Cited

U.S. PATENT DOCUMENTS

2016/0150435 A1   5/2016  Baek et al.
2016/0353510 A1   12/2016  Zhang et al.
(Continued)

FOREIGN PATENT DOCUMENTS

CN   102026404 A   4/2011
CN   105577634 A   5/2016
(Continued)

OTHER PUBLICATIONS

Huawei, HiSilicon, Beam failure recovery. 3GPP TSG RAN WG1 Meeting #89, Hangzhou, China, 15 May 19, 2017, R1-1708135, 9 pages.
(Continued)

*Primary Examiner* — Justin T Van Roie
(74) *Attorney, Agent, or Firm* — Womble Bond Dickinson (US) LLP

(57) ABSTRACT

This application provides an information indication method. The method includes: determining, by a terminal device, that communication on a first downlink resource fails, where the first downlink resource is a resource configured by a network device for the terminal device; and sending, by the terminal device, first indication information to a network device on a first uplink resource, where the first indication information is used to indicate that the communication on the first downlink resource fails, the first uplink resource is a resource used to carry second indication information, and lengths of respective information bits of the second indication information and the first indication information are the same, but status bits of the information bits are different.

18 Claims, 3 Drawing Sheets

(51) Int. Cl.
*H04W 28/04* (2009.01)
*H04W 72/04* (2023.01)

(56) References Cited

U.S. PATENT DOCUMENTS

2018/0042000 A1    2/2018  Zhang et al.
2020/0076556 A1*   3/2020  Takahashi ............. H04L 5/0053
2020/0244329 A1*   7/2020  Xiao .................... H04B 7/0413

FOREIGN PATENT DOCUMENTS

| WO | 2016003216 A1 | 1/2016 |
| WO | 2016163843 A1 | 10/2016 |
| WO | 2016165128 A1 | 10/2016 |

OTHER PUBLICATIONS

Samsung, BSI/CSI Transmission on PUCCH. 3GPP TSG RAN WG1 NR Ad-Hoc#2, Qingdao, China, 27th Jun. 30, 2017, R1-1710717, 3 pages.

* cited by examiner

INFORMATION INDICATION METHOD AND APPARATUS

CROSS-REFERENCE TO RELATED APPLICATIONS

This application is a continuation of International Application No. PCT/CN2018/099884, filed on Aug. 10, 2018, which claims priority to Chinese Patent Application No. 201710954653.7, filed on Oct. 13, 2017 and Chinese Patent Application No. 201710687960.3, filed on Aug. 11, 2017. All of the aforementioned patent applications are hereby incorporated by reference in their entireties.

TECHNICAL FIELD

This application relates to the field of communications technologies, and in particular, to an information indication method and an apparatus.

BACKGROUND

Currently, different types of reference signals are usually used in a communications system. One type of reference signal is used for channel estimation, and this type of reference signal can be used to perform coherent demodulation on a received signal including control information or data. Another type is used for channel state or channel quality measurement, and this type of reference signal can be used to implement scheduling for user equipment (UE). User equipment obtains channel state information CSI through channel quality measurement performed on a channel state information reference signal (CSI-RS). The CSI includes a rank indication (RI), a precoding indicator (PMI), a channel quality indicator (CQI), and the like. The CSI information may be sent by the user equipment to a base station by using a physical uplink control channel or a physical uplink shared channel.

With emergence of intelligent terminals, especially video services, current spectrum resources can hardly meet an explosive growth of user's capacity requirements. A high frequency band (for example, a millimeter-wave band) with a larger available bandwidth gradually becomes a candidate frequency band of a next generation communications system. In addition, a multiple-antenna technology is usually used in a modern communications system, to increase system capacity and coverage or improve user experience. Another advantage of using the high frequency band is that a size of a multiple-antenna configuration can be greatly reduced. This facilitates site location obtaining and deployment of more antennas. However, different from an operating band of an existing system such as LTE, the high frequency band causes a larger path loss, and especially, a loss in radio propagation becomes worse due to factors such as atmosphere and vegetation.

To overcome the large propagation loss, a common signal transmission mechanism based on a beamforming technology is applied, with the intention of using a relatively large antenna gain to compensate for the loss in a common signal transmission process. A beamforming common signal may include a broadcast channel, a synchronization signal, a cell-specific reference signal, or the like.

When the common signal is transmitted based on the beamforming technology, once a user moves, a direction of a beamformed beam corresponding to a transmitted signal no longer matches a location of the user after the movement, and interruption of a received signal may occur frequently. To track changes of the beamformed beam in the common signal transmission process, channel quality measurement and result reporting based on the beamforming technology are introduced. The channel quality measurement may be based on a beamformed synchronization signal or cell-specific reference signal. Handover of the user between different beamformed beams is more dynamic and frequent than handover between cells. Therefore, a dynamic measurement reporting mechanism is required. Similar to CSI information reporting, reporting of a channel quality result of the beamformed beam may also be sent by the user equipment to the base station by using a physical uplink control channel or a physical uplink shared channel.

After measuring a plurality of beams sent by the base station, the UE selects N best beams of the base station, and reports measurement information of the N best beams to the base station. In a subsequent process of communication with the UE, the base station uses the N beams for data transmission. However, due to blocking in a communication process and a poor diffraction capability over a high frequency channel, a current serving beam may be blocked, and a signal cannot be further transmitted. Therefore, to avoid sudden interruption of communication when a beam is blocked, the base station needs to be notified in a timely manner when it is detected that the beam is blocked, so as to restore a communications link as soon as possible.

SUMMARY

This application provides an information indication method and an apparatus, so that a communications link can be restored in a timely manner when communication on a downlink resource fails, and resource overheads can be reduced when a network device is notified that the communication on the downlink resource fails.

According to a first aspect, an information indication method is provided. The method includes: determining, by a terminal device, that communication on a first downlink resource fails, where the first downlink resource is a resource configured by a network device for the terminal device; and sending, by the terminal device, first indication information to the network device on a first uplink resource, where the first indication information is used to indicate that the communication on the first downlink resource fails, the first uplink resource is a resource used to carry second indication information, the first uplink resource is a resource allocated by the network device to the terminal device, lengths of respective information bits of the second indication information and the first indication information are the same, but status bits of the information bits are different.

In this application, when determining that the communication on the first downlink resource fails, the terminal device sends the first indication information to the network device on the resource that carries the second indication information, to indicate, to the network device, that the communication on the first downlink resource fails, so that when communication on a downlink resource fails, no uplink transmission resource needs to be allocated individually to the terminal device to report failure of the communication on the downlink resource, but instead an uplink resource allocated to other indication information (for example, the second indication information) is reused to report failure of the communication on the downlink resource. Therefore, failure of the communication on the downlink resource is notified to the base station in a timely manner, and resource overheads can be reduced.

In one embodiment, the first uplink resource is a periodic or semi-persistent physical uplink control channel PUCCH resource.

In one embodiment, the second indication information is beam state information periodically or semi-persistently reported by the terminal device, the beam state information includes N pieces of first index information and/or N pieces of first quality information, the first index information is used to indicate an index of a first reference signal resource, the first quality information is quality information of a reference signal carried on the first reference signal resource, and the first reference signal resource is used for beam measurement, where N is a positive integer greater than or equal to 1.

In one embodiment, the N pieces of first index information belong to a same reference signal resource group or belong to M reference signal resource groups, and any two of the N pieces of first index information are different and/or indexes of any two of the M reference signal resource groups are different, where M is an integer greater than 1 and less than or equal to N.

In one embodiment, the first indication information includes $N_1$ pieces of second index information and/or $N_1$ pieces of second quality information, the second index information is used to indicate an index of a second reference signal resource, the second quality information is quality information of a reference signal carried on the second reference signal resource, and $N_1$ second reference signal resources indicated by the $N_1$ pieces of second index information belong to a same reference signal resource group, where $N_1$ is a positive integer greater than 1 and less than or equal to N.

In one embodiment, the second reference signal resource is associated with a beam that is determined by the terminal device and that is used to restore communication between the terminal device and the network device, or the second reference signal resource corresponds to a reference signal resource detected by the terminal device in a candidate reference signal resource set, where channel quality of a reference signal carried on the reference signal resource is higher than a preset threshold.

In one embodiment, the $N_1$ pieces of second index information include at least two pieces of same second index information, and the at least two pieces of same second index information are used to indicate that the communication on the first downlink resource fails; and/or the at least two pieces of same second index information are used to indicate the beam that is determined by the terminal device and that is used to restore the communication between the terminal device and the network device, or the at least two pieces of same second index information are used to indicate an index of the reference signal resource detected by the terminal device in the candidate reference signal resource set, where the channel quality of the reference signal carried on the reference signal resource is higher than the preset threshold.

In one embodiment, the $N_1$ pieces of second quality information include at least two pieces of same second quality information, and the at least two pieces of same second quality information are used to indicate that the communication on the first downlink resource fails; and/or the at least two pieces of same second quality information are used to indicate the beam that is determined by the terminal device and that is used to restore communication between the terminal device and the network device, or the at least two pieces of same second quality information are used to indicate quality information of the reference signal resource detected by the terminal device in the candidate reference signal resource set, where the channel quality of the reference signal carried on the reference signal resource is higher than the preset threshold.

In one embodiment, the $N_1$ pieces of second quality information include at least one piece of lowest-value second quality information, and the at least one piece of lowest-value second quality information is used to indicate that the communication on the first downlink resource fails; and/or the at least one piece of lowest-value second quality information is used to indicate the beam that is determined by the terminal device and that is used to restore communication between the terminal device and the network device, or the at least one piece of lowest-value second quality information is used to indicate quality information of the reference signal resource detected by the terminal device in the candidate reference signal resource set, where the channel quality of the reference signal carried on the reference signal resource is higher than the preset threshold.

In one embodiment, any two of the $N_1$ pieces of second index information are the same, and the any two pieces of same second index information are used to indicate that the communication on the first downlink resource fails; and/or the any two pieces of same second index information are used to indicate the beam that is determined by the terminal device and that is used to restore the communication between the terminal device and the network device, or the any two pieces of same second index information are used to indicate the index of the reference signal resource detected by the terminal device in the candidate reference signal resource set, where the channel quality of the reference signal carried on the reference signal resource is higher than the preset threshold; and/or any two of the $N_1$ pieces of second quality information are the same, and the any two pieces of same second quality information are completely the same and are used to indicate that the communication on the first downlink resource fails; and/or the any two pieces of same second quality information are used to indicate the beam that is recommended or determined by the terminal device and that is used to restore communication between the terminal device and the network device, or the any two pieces of same second quality information are used to indicate the index and/or the quality information of the reference signal resource detected by the terminal device in the candidate reference signal resource set, where the channel quality of the reference signal carried on the reference signal resource is higher than the preset threshold.

In one embodiment, any two of the $N_1$ pieces of second index information are the same, and the any two pieces of same second index information are used to indicate that the communication on the first downlink resource fails; and/or the any two pieces of same second index information are used to indicate the beam that is determined by the terminal device and that is used to restore the communication between the terminal device and the network device, or the any two pieces of same second index information are used to indicate the index of the reference signal resource detected by the terminal device in the candidate reference signal resource set, where the channel quality of the reference signal carried on the reference signal resource is higher than the preset threshold; and/or the $N_1$ pieces of second quality information include $N_1$-1 or $N_1$-2 pieces of lowest-value second quality information, and the $N_1$-1 or $N_1$-2 pieces of lowest-value second quality information are used to indicate that the communication on the first downlink resource fails; and/or the $N_1$-1 or $N_1$-2 pieces of lowest-value second quality information are used to indicate the beam that is recommended or determined by the terminal device and that is used to restore communication between the terminal device and the network device, or the $N_1$-1 or $N_1$-2 pieces of lowest-value second quality information are used to indicate the index and/or the quality information of the reference signal resource detected by the terminal device in the candidate reference signal resource set, where the channel quality of the reference signal carried on the reference signal resource is higher than the preset threshold.

Therefore, the terminal device reports index information of $N_1$ repeated reference signal resources and/or $N_1$ pieces of corresponding quality information. This helps reduce a bit error rate of decoding the second index information and/or the second quality information by the network device and improve decoding correctness, and this also helps improve a probability of restoring communication between the terminal device and the network device.

In one embodiment, bits of the $N_1$ pieces of second quality information are special status bits, the special status bit includes either a null indication or a lowest indication bit of quality information, and the special status bit is used to indicate that the communication on the first downlink resource fails.

In one embodiment, the first indication information includes $N_2$ pieces of third index information and/or $N_2$ pieces of third quality information, the third index information is used to indicate an index of a third reference signal resource, the third quality information is quality information of a reference signal carried on the third reference signal resource, channel quality of the third quality information is lower than a preset threshold, the third reference signal resource corresponds to a reference signal resource that is associated with control channel spatial QCL configured by the network device for the terminal device, and $N_2$ third reference signal resources indicated by the $N_2$ pieces of third index information belong to a same reference signal resource group, where $N_2$ is a positive integer greater than or equal to 1 and less than or equal to N.

In one embodiment, the $N_2$ pieces of third index information include at least two pieces of same third index information, and the at least two pieces of same third index information are used to indicate that the communication on the first downlink resource fails; and/or the $N_2$ pieces of third quality information include at least two pieces of same third quality information, and the at least two pieces of same third quality information are used to indicate that the communication on the first downlink resource fails.

In one embodiment, the $N_2$ pieces of third index information include at least two pieces of same third index information, and the at least two pieces of same third index information are used to indicate that the communication on the first downlink resource fails; and/or the $N_2$ pieces of third quality information include at least one piece of lowest-value third quality information, and the at least one piece of lowest-value third quality information is used to indicate that the communication on the first downlink resource fails.

In one embodiment, any two of the $N_2$ pieces of third index information are the same, and the any two pieces of same third index information are used to indicate that the communication on the first downlink resource fails; and/or the $N_2$ pieces of third quality information are completely the same, and the any two pieces of same third quality information are used to indicate that the communication on the first downlink resource fails.

In one embodiment, any two of the $N_2$ pieces of third index information are the same, and the any two pieces of same third index information are used to indicate that the communication on the first downlink resource fails; and/or the $N_2$ pieces of third quality information include $N_2$-1 or $N_2$-2 pieces of lowest-value third quality information, and the $N_2$-1 or $N_2$-2 pieces of lowest-value third quality information are used to indicate that the communication on the first downlink resource fails.

Therefore, the terminal device reports index information of $N_2$ repeated reference signal resources and/or $N_2$ pieces of corresponding quality information. This helps reduce a bit error rate of decoding the second index information and/or the second quality information by the network device and improve decoding correctness, and this also helps improve a probability of restoring communication between the terminal device and the network device.

In one embodiment, bits of the $N_2$ pieces of third quality information are special status bits, the special status bit includes either a null indication or a lowest indication bit of quality information, and the special status bit is used to indicate that the communication on the first downlink resource fails.

In one embodiment, the first indication information includes first parameter information and second parameter information, the first parameter information includes the $N_1$ pieces of second index information and/or the $N_1$ pieces of second quality information, and the second parameter information includes the $N_2$ pieces of third index information and/or the $N_2$ pieces of third quality information, where the $N_1$ pieces of second index information include at least two pieces of same second index information, and the at least two pieces of same second index information are used to indicate that the communication on the first downlink resource fails; and/or the $N_1$ pieces of second quality information include at least two pieces of same second quality information, and the at least two pieces of same second quality information are used to indicate that the communication on the first downlink resource fails; and/or the $N_2$ pieces of third index information include at least two pieces of same third index information, and the at least two pieces of same third index information are used to indicate that the communication on the first downlink resource fails; and/or the $N_2$ pieces of third quality information include at least two pieces of same third quality information, and the at least two pieces of same third quality information are used to indicate that the communication on the first downlink resource fails; and/or a bit of at least one of the $N_2$ pieces of third quality information is a special status bit, and the special status bit is used to indicate that the communication on the first downlink resource fails, where $N_1+N_2 \leq N$.

In one embodiment, the first indication information includes first parameter information and second parameter information, the first parameter information includes the $N_1$ pieces of second index information and/or the $N_1$ pieces of second quality information, and the second parameter information includes the $N_2$ pieces of third index information and/or the $N_2$ pieces of third quality information, where the $N_1$ pieces of second index information include at least two pieces of same second index information, and the at least two pieces of same second index information are used to indicate that the communication on the first downlink resource fails; and/or the $N_1$ pieces of second quality information include at least one piece of lowest-value second quality information, and the at least one piece of lowest-value second quality information is used to indicate that the communication on the first downlink resource fails; and/or the $N_2$ pieces of third index information include at least two pieces of same third index information, and the at least two pieces of same third index information are used to indicate that the communication on the first downlink resource fails; and/or the $N_2$ pieces of third quality information include at least one piece of lowest-value third quality information, and the at least one piece of lowest-value third quality information is used to indicate that the communication on the first downlink resource fails; and/or a bit of at least one of the $N_1$ pieces of second quality information is a special status bit, and the special status bit is used to indicate that the communication on the first downlink resource fails; and/or a bit of at least one of the $N_2$ pieces of third quality information is a special status bit, and the special status bit is used to indicate that the communication on the first downlink resource fails, where $N_1+N_2 \leq N$.

In one embodiment, the first indication information includes first parameter information and second parameter information, the first parameter information includes the $N_1$ pieces of second index information and/or the $N_1$ pieces of second quality information, and the second parameter information includes the $N_2$ pieces of third index information and/or the $N_2$ pieces of third quality information, where the $N_1$ pieces of second index information include at least two pieces of same second index information, and the at least two pieces of same second index information are used to indicate that the communication on the first downlink resource fails; and/or the $N_1$ pieces of second quality information include $N_1-1$ or $N_1-2$ pieces of lowest-value second quality information, and the $N_1-1$ or $N_1-2$ pieces of lowest-value second quality information are used to indicate that the communication on the first downlink resource fails; and/or the $N_2$ pieces of third index information include at least two pieces of same third index information, and the at least two pieces of same third index information are used to indicate that the communication on the first downlink resource fails; and/or the $N_2$ pieces of third quality information include $N_2-1$ or $N_2-2$ pieces of lowest-value third quality information, and the $N_2-1$ or $N_2-2$ pieces of lowest-value third quality information are used to indicate that the communication on the first downlink resource fails; and/or a bit of at least one of the $N_1$ pieces of second quality information is a special status bit, and the special status bit is used to indicate that the communication on the first downlink resource fails; and/or a bit of at least one of the $N_2$ pieces of third quality information is a special status bit, and the special status bit is used to indicate that the communication on the first downlink resource fails, where $N_1+N_2 \leq N$.

In one embodiment, N, $N_1$, and $N_2$ are configured by the network device, or N, $N_1$, and $N_2$ are predefined.

In one embodiment, the method further includes: receiving, by the terminal device, acknowledgment information that is associated with the first indication information and that is sent by the network device, where the acknowledgment information is used to indicate that the network device correctly receives the first indication information.

In one embodiment, the first indication information is information obtained by jointly encoding the beam state information and beam failure recovery request information, and the beam failure recovery request information is used to indicate that the communication on the first downlink resource fails.

The beam state information and the beam failure recovery request information are jointly encoded, and the encoded first indication information is sent to the network device on the resource that carries the beam state information, so that based on the first indication information, the network device can not only determine the beam state information, but also can determine that the communication on the first downlink resource fails. Therefore, failure of communication on the first downlink resource is notified to the base station in a timely manner, and resource overheads can be reduced.

In one embodiment, the first indication information may alternatively be beam failure recovery request information. In this case, an information indication bit needs to be added (for example, one information bit is added) to indicate, to a network, that the first indication information is the beam failure recovery request information, so that the network device determines, based on the first indication information, that the communication on the first downlink resource fails. Therefore, failure of the communication on the first downlink resource is notified to the base station in a timely manner, and resource overheads can be reduced.

In one embodiment, the first indication information is channel state information CSI.

Specifically, when the first indication information is channel state information (Channel state information, CSI), the terminal device sends the first indication information to the network device on a resource that carries the channel state information CSI, where the first indication information is used to indicate, to the network device, that the communication on the first downlink resource fails.

In one embodiment, a redundant status bit or a special status bit of the channel state information CSI carries the beam failure recovery request information, and the beam failure recovery request information is used to indicate that the communication on the first downlink resource fails.

The beam failure recovery request information is carried by the redundant status bit or the special status bit of the channel state information, and the first indication information is sent to the network device on the resource that carries the channel state information, so that the network device determines, based on the first indication information, that the communication on the first downlink resource fails. Therefore, failure of the communication on the first downlink resource is notified to the base station in a timely manner, and resource overheads can be reduced.

In one embodiment, the first indication information is information obtained by jointly encoding the channel state information and beam failure recovery request information, and the beam failure recovery request information is used to indicate that the communication on the first downlink resource fails.

The channel state information and the beam failure recovery request information are jointly encoded, and the encoded first indication information is sent to the network device on the resource that carries the channel state information, so that based on the first indication information, the network device can not only determine the channel state information, but also can determine that communication on a beam fails. Therefore, failure of communication on a beam is notified to the base station in a timely manner, and resource overheads can be reduced.

According to a second aspect, an information indication method is provided. The method includes: receiving, by a network device on a first uplink resource, first indication information sent by a terminal device, where the first indication information is used to indicate that communication on the first downlink resource fails, the first uplink resource is a resource used to carry second indication information, the first uplink resource is a resource allocated by the network device to the terminal device, lengths of respective information bits of the second indication information and the first indication information are the same, but status bits of the information bits are different; and determining, by the network device based on the first indication information, that the communication on the first downlink resource fails.

In this application, when determining that the communication on the first downlink resource fails, the terminal device sends the first indication information to the network device on the resource that carries the second indication information, to indicate, to the network device, that the communication on the first downlink resource fails, so that when communication on a downlink resource fails, no uplink transmission resource needs to be allocated individually to the terminal device to report failure of the communication on the downlink resource, but instead an uplink resource allocated to other indication information (for example, the second indication information) is reused to report failure of the communication on the downlink resource. Therefore, failure of the communication on the downlink resource is notified to the base station in a timely manner, and resource overheads can be reduced.

In one embodiment, the first uplink resource is a periodic or semi-persistent physical uplink control channel PUCCH resource.

In one embodiment, the second indication information is beam state information periodically or semi-persistently reported by the terminal device, the beam state information includes N pieces of first index information and/or N pieces of first quality information, the first index information is used to indicate an index of a first reference signal resource, the first quality information is quality information of a reference signal carried on the first reference signal resource, and the first reference signal resource is used for beam measurement, where N is a positive integer greater than or equal to 1.

In one embodiment, the N pieces of first index information belong to a same reference signal resource group or belong to M reference signal resource groups, and any two of the N pieces of first index information are different and/or indexes of any two of the M reference signal resource groups are different, where M is an integer greater than 1 and less than or equal to N.

In one embodiment the determining, by the network device based on the first indication information, that the communication on the first downlink resource fails includes: the first indication information includes $N_1$ pieces of second index information and/or $N_1$ pieces of second quality information, the second index information is used to indicate an index of a second reference signal resource, the second quality information is quality information of a reference signal carried on the second reference signal resource, and $N_1$ second reference signal resources indicated by the $N_1$ pieces of second index information belong to a same reference signal resource group, where $N_1$ is a positive integer greater than 1 and less than or equal to N.

In one embodiment, the second reference signal resource is associated with a beam that is determined by the terminal device and that is used to restore communication between the terminal device and the network device, or the second reference signal resource corresponds to a reference signal resource detected by the terminal device in a candidate reference signal resource set, where channel quality of a reference signal carried on the reference signal resource is higher than a preset threshold.

In one embodimentthe $N_1$ pieces of second index information include at least two pieces of same second index information, and the at least two pieces of same second index information are used to indicate the beam that is determined by the terminal device and that is used to restore the communication between the terminal device and the network device, or the at least two pieces of same second index information are used to indicate an index of the reference signal resource detected by the terminal device in the candidate reference signal resource set, where the channel quality of the reference signal carried on the reference signal resource is higher than the preset threshold; and the determining, by the network device based on the first indication information, that the communication on the first downlink resource fails includes: determining, by the network device based on the at least two pieces of same second index information, that the communication on the first downlink resource fails.

In one embodiment, the $N_1$ pieces of second quality information include at least two pieces of same second quality information, and the at least two pieces of same second quality information are used to indicate the beam that is determined by the terminal device and that is used to restore the communication between the terminal device and the network device, or the at least two pieces of same second quality information are used to indicate quality information of the reference signal resource detected by the terminal device in the candidate reference signal resource set, where the channel quality of the reference signal carried on the reference signal resource is higher than the preset threshold; and the determining, by the network device based on the first indication information, that the communication on the first downlink resource fails includes: determining, by the network device based on the at least two pieces of same second quality information, that the communication on the first downlink resource fails.

In one embodiment, the $N_1$ pieces of second quality information include at least one lowest-value second quality information; the at least one piece of lowest-value second quality information is used to indicate the beam that is determined by the terminal device and that is used to restore the communication between the terminal device and the network device, or the at least one piece of lowest-value second quality information is used to indicate quality information of the reference signal resource detected by the terminal device in the candidate reference signal resource set, where the channel quality of the reference signal carried on the reference signal resource is higher than the preset threshold; and the determining, by the network device based on the first indication information, that the communication on the first downlink resource fails includes: determining, by the network device based on the at least one piece of lowest-value second quality information, that the communication on the first downlink resource fails.

In one embodiment, any two of the $N_1$ pieces of second index information are the same, and the any two pieces of same second index information are used to indicate the beam that is determined by the terminal device and that is used to restore the communication between the terminal device and the network device, or the any two pieces of same second index information are used to indicate the index of the reference signal resource detected by the terminal device in the candidate reference signal resource set, where the channel quality of the reference signal carried on the reference signal resource is higher than the preset threshold; and the determining, by the network device based on the first indication information, that the communication on the first downlink resource fails includes: determining, by the network device based on the any two pieces of same second index information, that the communication on the first downlink resource fails; and/or any two of the $N_1$ pieces of second quality information are the same, and the any two pieces of same second quality information are used to indicate the quality information of the reference signal resource detected by the terminal device in the candidate reference signal resource set, where the channel quality of the reference signal carried on the reference signal resource is higher than the preset threshold, or the any two pieces of same second quality information are used to indicate the beam that is determined by the terminal device and that is used to restore the communication between the terminal device and the network device; and the determining, by the network device based on the first indication information, that the communication on the first downlink resource fails includes: determining, by the network device based on the any two pieces of same second quality information, that the communication on the first downlink resource fails.

In one embodiment, any two of the $N_1$ pieces of second index information are the same, and the any two pieces of same second index information are used to indicate the beam that is determined by the terminal device and that is used to restore the communication between the terminal device and the network device, or the any two pieces of same second index information are used to indicate the index of the reference signal resource detected by the terminal device in the candidate reference signal resource set, where the channel quality of the reference signal carried on the reference signal resource is higher than the preset threshold; and the determining, by the network device based on the first indication information, that the communication on the first downlink resource fails includes: determining, by the network device based on the any two pieces of same second index information, that the communication on the first downlink resource fails; and/or the $N_1$ pieces of second quality information include $N_1$-1 or $N_1$-2 pieces of lowest-value second quality information, and the $N_1$-1 or $N_1$-2 pieces of lowest-value second quality information are used to indicate the quality information of the reference signal resource detected by the terminal device in the candidate reference signal resource set, where the channel quality of the reference signal carried on the reference signal resource is higher than the preset threshold, or the $N_1$-1 or $N_1$-2 pieces of lowest-value second quality information are used to indicate the beam that is determined by the terminal device and that is used to restore the communication between the terminal device and the network device; and the determining, by the network device based on the first indication information, that the communication on the first downlink resource fails includes: determining, by the network device based on the $N_1$-1 or $N_1$-2 pieces of lowest-value second quality information, that the communication on the first downlink resource fails.

Therefore, the terminal device reports index information of $N_1$ repeated reference signal resources and/or $N_1$ pieces of corresponding quality information. This helps reduce a bit error rate of decoding the second index information and/or the second quality information by the network device and improve decoding correctness, and this also helps improve a probability of restoring communication between the terminal device and the network device.

In one embodiment, bits of the $N_1$ pieces of second quality information are special status bits, the special status bit includes either a null indication or a lowest indication bit of quality information, and the determining, by the network device based on the first indication information, that the communication on the first downlink resource fails includes: determining, by the network device based on the special status bit, that the communication on the first downlink resource fails.

In one embodiment, the first indication information includes $N_2$ pieces of third index information and/or $N_2$ pieces of third quality information, the third index information is used to indicate an index of a third reference signal resource, the third quality information is quality information of a reference signal carried on the third reference signal resource, channel quality of the third quality information is lower than a preset threshold, the third reference signal resource corresponds to a reference signal resource that is associated with control channel spatial QCL configured by the network device for the terminal device, and $N_2$ third reference signal resources indicated by the $N_2$ pieces of third index information belong to a same reference signal resource group, where $N_2$ is a positive integer greater than or equal to 1 and less than or equal to N.

In one embodiment, the $N_2$ pieces of third index information include at least two pieces of same third index information, and the determining, by the network device based on the first indication information, that the communication on the first downlink resource fails includes: determining, by the network device based on the at least two pieces of same third index information, that the communication on the first downlink resource fails; and/or the $N_2$ pieces of third quality information include at least two pieces of same third quality information, and the determining, by the network device based on the first indication information, that the communication on the first downlink resource fails includes: determining, by the network device based on the at least two pieces of same third quality information, that the communication on the first downlink resource fails.

In one embodiment, the $N_2$ pieces of third index information include at least two pieces of same third index information, and the determining, by the network device based on the first indication information, that the communication on the first downlink resource fails includes: determining, by the network device based on the at least two pieces of same third index information, that the communication on the first downlink resource fails; and/or the $N_2$ pieces of third quality information include at least one piece of lowest-value third quality information, and the determining, by the network device based on the first indication information, that the communication on the first downlink resource fails includes: determining, by the network device based on the at least one piece of lowest-value third quality information, that the communication on the first downlink resource fails.

In one embodiment, any two of the $N_2$ pieces of third index information are the same, and the determining, by the network device based on the first indication information, that the communication on the first downlink resource fails includes: determining, by the network device based on the any two pieces of same third index information, that the communication on the first downlink resource fails; and/or the $N_2$ pieces of third quality information are completely the same, and the determining, by the network device based on the first indication information, that the communication on the first downlink resource fails includes: determining, by the network device based on the any two pieces of same third quality information, that the communication on the first downlink resource fails.

In one embodiment, any two of the $N_2$ pieces of third index information are the same, and the determining, by the network device based on the first indication information, that the communication on the first downlink resource fails includes: determining, by the network device based on the any two pieces of same third index information, that the communication on the first downlink resource fails; and/or the $N_2$ pieces of third quality information include $N_2$-1 or $N_2$-2 pieces of lowest-value third quality information, and the determining, by the network device based on the first indication information, that the communication on the first downlink resource fails includes: determining, by the network device based on the $N_2$-1 or $N_2$-2 pieces of lowest-value third quality information, that the communication on the first downlink resource fails.

Therefore, the terminal device reports index information of $N_2$ repeated reference signal resources and/or $N_2$ pieces of corresponding quality information. This helps reduce a bit error rate of decoding the second index information and/or the second quality information by the network device and improve decoding correctness, and this also helps improve a probability of restoring communication between the terminal device and the network device.

In one embodiment, bits of the $N_2$ pieces of third quality information are special status bits, the special status bit includes either a null indication or a lowest indication bit of quality information, and the determining, by the network device based on the first indication information, that the communication on the first downlink resource fails includes: determining, by the network device based on the special status bit, that the communication on the first downlink resource fails.

In one embodiment, the first indication information includes first parameter information and second parameter information, the first parameter information includes the $N_1$ pieces of second index information and/or the $N_1$ pieces of second quality information, the second parameter information includes the $N_2$ pieces of third index information and/or the $N_2$ pieces of third quality information, the $N_1$ pieces of second index information includes at least two pieces of same second index information, and the determining, by the network device based on the first indication information, that the communication on the first downlink resource fails includes: determining, by the network device based on the at least two pieces of same second index information, that the communication on the first downlink resource fails; and/or the $N_1$ pieces of second quality information include at least two pieces of same second quality information, and the determining, by the network device based on the first indication information, that the communication on the first downlink resource fails includes: determining, by the network device based on the at least two pieces of same second quality information, that the communication on the first downlink resource fails; and/or the $N_2$ pieces of third index information include at least two pieces of same third index information, and the determining, by the network device based on the first indication information, that the communication on the first downlink resource fails includes: determining, by the network device based on the at least two pieces of same third index information, that the communication on the first downlink resource fails; and/or the $N_2$ pieces of third quality information include at least two pieces of same third quality information, and the determining, by the network device based on the first indication information, that the communication on the first downlink resource fails includes: determining, by the network device based on the at least two pieces of same third quality information, that the communication on the first downlink resource fails; and/or a bit of at least one of the $N_1$ pieces of second quality information is a special status bit, and the network device determines, based on the first indication information, that the communication on the first downlink resource fails; and/or a bit of at least one of the $N_2$ pieces of third quality information is a special status bit, and the determining, by the network device based on the first indication information, that the communication on the first downlink resource fails includes: determining, by the network device based on the special status bit, that the communication on the first downlink resource fails, where $N_1+N_2 \leq N$.

In one embodiment, the first indication information includes first parameter information and second parameter information, the first parameter information includes the $N_1$ pieces of second index information and/or the $N_1$ pieces of second quality information, the second parameter information includes the $N_2$ pieces of third index information and/or the $N_2$ pieces of third quality information, the $N_1$ pieces of second index information includes at least two pieces of same second index information, and the determining, by the network device based on the first indication information, that the communication on the first downlink resource fails includes: determining, by the network device based on the at least two pieces of same second index information, that the communication on the first downlink resource fails; and/or the $N_1$ pieces of second quality information include at least one piece of lowest-value second quality information, and the determining, by the network device based on the first indication information, that the communication on the first downlink resource fails includes: determining, by the network device based on the at least one piece of lowest-value second quality information, that the communication on the first downlink resource fails; and/or the $N_2$ pieces of third index information include at least two pieces of same third index information, and the determining, by the network device based on the first indication information, that the communication on the first downlink resource fails includes: determining, by the network device based on the at least two pieces of same third index information, that the communication on the first downlink resource fails; and/or the $N_2$ pieces of third quality information include at least one piece of lowest-value third quality information, and the determining, by the network device based on the first indication information, that the communication on the first downlink resource fails includes: determining, by the network device based on the at least one piece of lowest-value third quality information, that the communication on the first downlink resource fails; and/or a bit of at least one of the $N_1$ pieces of second quality information is a special status bit, and the network device determines, based on the first indication information, that the communication on the first downlink resource fails; and/or a bit of at least one of the $N_2$ pieces of third quality information is a special status bit, and the determining, by the network device based on the first indication information, that the communication on the first downlink resource fails includes: determining, by the network device based on the special status bit, that the communication on the first downlink resource fails, where $N_1+N_2 \leq N$.

In one embodiment, the first indication information includes first parameter information and second parameter information, the first parameter information includes the $N_1$ pieces of second index information and/or the $N_1$ pieces of second quality information, the second parameter information includes the $N_2$ pieces of third index information and/or the $N_2$ pieces of third quality information, the $N_1$ pieces of second index information include at least two pieces of same second index information, and the determining, by the network device based on the first indication information, that the communication on the first downlink resource fails includes: determining, by the network device based on the at least two pieces of same second index information, that the communication on the first downlink resource fails; and/or the $N_1$ pieces of second quality information include $N_1$-1 or $N_1$-2 pieces of lowest-value second quality information, and the determining, by the network device based on the first indication information, that the communication on the first downlink resource fails includes: determining, by the network device based on the $N_1$-1 or $N_1$-2 pieces of lowest-value second quality information, that the communication on the first downlink resource fails; and/or the $N_2$ pieces of third index information include at least two pieces of same third index information, and the determining, by the network device based on the first indication information, that the communication on the first downlink resource fails includes: determining, by the network device based on the at least two pieces of same third index information, that the communication on the first downlink resource fails; and/or the $N_2$ pieces of third quality information include $N_2$-1 or $N_2$-2 pieces of lowest-value third quality information, and the determining, by the network device based on the first indication information, that the communication on the first downlink resource fails includes: determining, by the network device based on the $N_2$-1 or $N_2$-2 pieces of lowest-value third quality information, that the communication on the first downlink resource fails; and/or a bit of at least one of the $N_1$ pieces of second quality information is a special status bit, and the network device determines, based on the first indication information, that the communication on the first downlink resource fails; and/or a bit of at least one of the $N_2$ pieces of third quality information is a special status bit, and the determining, by the network device based on the first indication information, that the communication on the first downlink resource fails includes: determining, by the network device based on the special status bit, that the communication on the first downlink resource fails, where $N_1+N_2 \leq N$.

In one embodiment, N, $N_1$, and $N_2$ are configured by the network device, or N, $N_1$, and $N_2$ are predefined.

In one embodiment, the method further includes: sending, by the network device, acknowledgment information that is associated with the first indication information to the terminal device, where the acknowledgment information is used to indicate that the network device correctly receives the first indication information.

In one embodiment, the first indication information is information obtained by jointly encoding the beam state information and beam failure recovery request information, and the beam failure recovery request information is used to indicate that the communication on the first downlink resource fails.

The beam state information and the beam failure recovery request information are jointly encoded, and the encoded first indication information is sent to the network device on the resource that carries the beam state information, so that based on the first indication information, the network device can not only determine the beam state information, but also can determine that the communication on the first downlink resource fails. Therefore, failure of the communication on the first downlink resource is notified to the base station in a timely manner, and resource overheads can be reduced.

In one embodiment, the first indication information may alternatively be beam failure recovery request information. In this case, an information indication bit needs to be added (for example, one information bit is added) to indicate, to a network, that the first indication information is the beam failure recovery request information, so that the network device determines, based on the first indication information, that the communication on the first downlink resource fails. Therefore, failure of the communication on the first downlink resource is notified to the base station in a timely manner, and resource overheads can be reduced.

In one embodiment, the first indication information is channel state information CSI.

Specifically, when the first indication information is channel state information (Channel state information, CSI), the terminal device sends the first indication information to the network device on a resource that carries the channel state information CSI, where the first indication information is used to indicate, to the network device, that the communication on the first downlink resource fails.

In one embodiment, a redundant status bit or a special status bit of the channel state information CSI carries the beam failure recovery request information, and the beam failure recovery request information is used to indicate that the communication on the first downlink resource fails.

The beam failure recovery request information is carried by the redundant status bit or the special status bit of the channel state information, and the first indication information is sent to the network device on the resource that carries the channel state information, so that the network device determines, based on the first indication information, that the communication on the first downlink resource fails. Therefore, failure of the communication on the first downlink resource is notified to the base station in a timely manner, and resource overheads can be reduced.

In one embodiment, the first indication information is information obtained by jointly encoding the channel state information and beam failure recovery request information, and the beam failure recovery request information is used to indicate that the communication on the first downlink resource fails.

The channel state information and the beam failure recovery request information are jointly encoded, and the encoded first indication information is sent to the network device on the resource that carries the channel state information, so that based on the first indication information, the network device can not only determine the channel state information, but also can determine that communication on a beam fails. Therefore, failure of communication on a beam is notified to the base station in a timely manner, and resource overheads can be reduced.

According to a third aspect, a terminal device is provided. The terminal device is configured to perform the information indication method according to the first aspect or any possible implementation of the first aspect. Specifically, the terminal device may include a module configured to perform the information indication method according to the first aspect or any possible implementation of the first aspect.

According to a fourth aspect, a terminal device is provided. The terminal device includes a memory and a processor. The memory is configured to store an instruction. The processor is configured to execute the instruction stored in the memory, and the execution of the instruction stored in the memory enables the processor to perform the method according to any one of the first aspect or the possible implementations of the first aspect.

According to a fifth aspect, a computer-readable storage medium is provided. The computer-readable storage medium stores a computer program, and when the program is executed by a processor, the method according to any one of the first aspect or the possible implementations of the first aspect is implemented.

According to a sixth aspect, a network device is provided. The network device is configured to perform the information indication method according to any one of the second aspect or the possible implementations of the second aspect. Specifically, the network device may include a module configured to perform the information indication method according to any one of the second aspect or the possible implementations of the second aspect.

According to a seventh aspect, a network device is provided. The network device includes a memory and a processor. The memory is configured to store an instruction. The processor is configured to execute the instruction stored in the memory, and the execution of the instruction stored in the memory enables the processor to perform the method in any one of the second aspect or the possible implementations of the second aspect.

According to an eighth aspect, a computer-readable storage medium is provided. The computer-readable storage medium stores a computer program, and when the program is executed by a processor, the method according to any one of the second aspect or the possible implementations of the second aspect is implemented.

DESCRIPTION OF EMBODIMENTS

The following describes technical solutions of this application with reference to the accompanying drawings.

The technical solutions of the embodiments of this application may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communications system, a future 5th generation (5G) system, or new radio (NR).

The terminal device in the embodiments of this application may be user equipment, an access terminal, a subscriber unit, a subscriber station, a mobile station, a mobile, a remote station, a remote terminal, a mobile device, a user terminal, a terminal, a wireless communication device, a user agent, a user apparatus, or the like. The terminal device may also be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network ( ). This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

Figure 1:
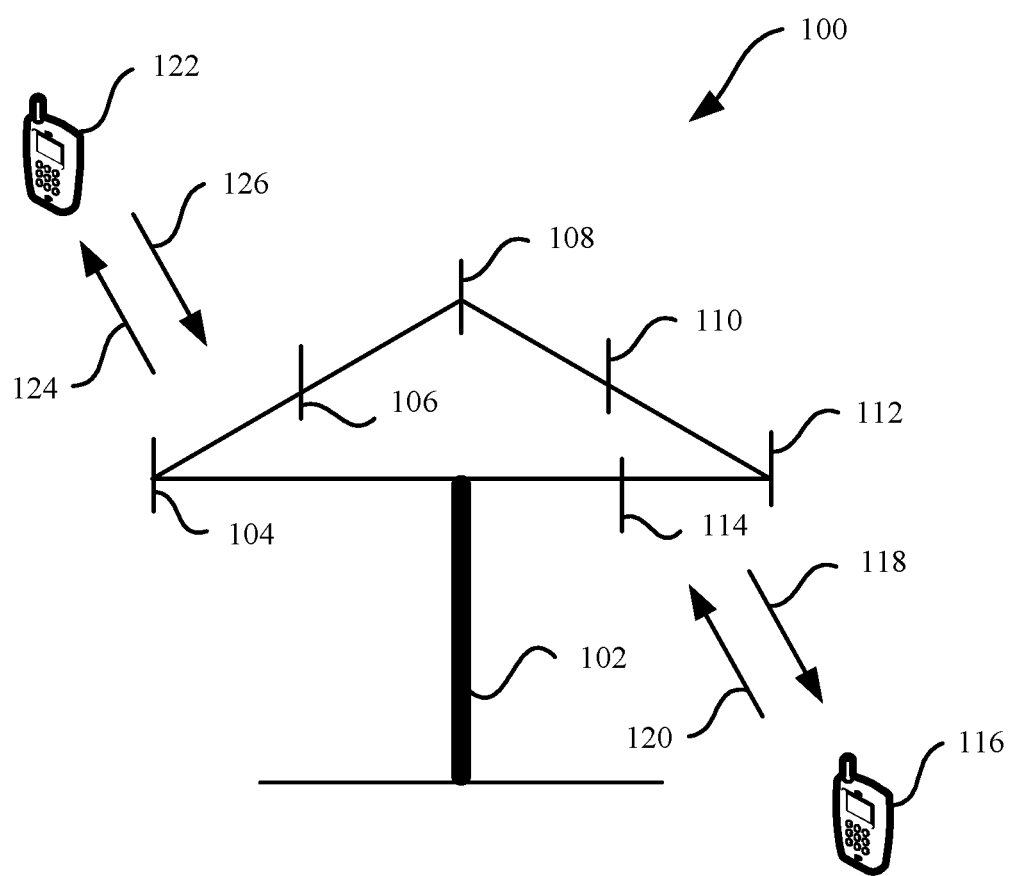
FIG. 1 is a schematic architectural diagram of a system according to an embodiment of this application.

FIG. 1 is a schematic diagram of a wireless communications system according to an embodiment of this application. As shown in FIG. 1, the communications system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (such as a terminal device 116 and a terminal device 122). However, it can be understood that the network device 102 may communicate with any quantity of terminal devices similar to the terminal device 116 or the terminal device 122. For example, the terminal devices 116 and 122 may be cellular phones, smartphones, portable computers, handheld communications devices, handheld computing devices, satellite radio apparatuses, global positioning systems, PDAs, and/or any other appropriate devices that are configured to perform communication in the wireless communications system 100.

As shown in FIG. 1, the terminal device 116 communicates with the antenna 112 and the antenna 114. The antenna 112 and the antenna 114 send information to the terminal device 116 over a forward link (also referred to as a downlink) 118, and receive information from the terminal device 116 over a reverse link (also referred to as an uplink) 120. In addition, the terminal device 122 communicates with the antennas 104 and 106, where the antennas 104 and 106 send information to the terminal device 122 by using a forward link 124, and receive information from the terminal device 122 by using a reverse link 126.

For example, in a frequency division duplex (FDD) system, the forward link 118 and the reserve link 120 may use different frequency bands, and the forward link 124 and the reverse link 126 may use different frequency bands.

For another example, in a time division duplex (TDD) system and a full duplex system, the forward link 118 and the reverse link 120 may use a common frequency band, and the forward link 124 and the reverse link 126 may use a common frequency band.

Each antenna (or an antenna group including a plurality of antennas) and/or each area that are/is designed for communication may be referred to as a sector of the network device 102. For example, the antenna group may be designed for communicating with a terminal device in the sector of a coverage area of the network device 102. A network device can send signals to all terminal devices in a sector corresponding to the network device by using a single antenna or through multi-antenna transmit diversity. In a process in which the network device 102 communicates with the terminal devices 116 and 122 through the forward links 118 and 124 respectively, transmit antennas of the network device 102 can increase signal-to-noise ratios of the forward links 118 and 124 through beamforming. In addition, compared with a manner in which a network device uses a single antenna or multi-antenna transmit diversity to send signals to all terminal devices served by the network device, when the network device 102 uses beamforming to send signals to the terminal devices 116 and 122 that are randomly scattered in the related coverage area, less interference is caused to a mobile device in a neighboring cell.

In a given time, the network device 102, the terminal device 116, or the terminal device 122 may be a wireless communication sending apparatus and/or a wireless communication receiving apparatus. When sending data, the wireless communications sending apparatus may encode data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a PLMN network, a D2D network, an M2M network, or another network. FIG. 1 is merely a simplified schematic diagram used as an example. The network may further include another network device, which is not shown in FIG. 1.

For ease of understanding this application, some elements introduced in descriptions of this application are first described herein.

1. Beam

Beams are classified into a transmit beam and a receive beam of a network device, and a transmit beam and a receive beam of a terminal device. The transmit beam of the network device is used to describe transmitter-side beamforming information of the network device, and the receive beam of the network device is used to describe receiver-side beamforming information of the network device. The transmit beam of the terminal device is used to describe transmitter-side beamforming information of the terminal device, and a terminal beam of the network device is used to describe receiver-side beamforming information of the terminal device. To be specific, a beam is used to describe beamforming information.

In the embodiments of this application, the beam may correspond to a time resource or a spatial resource.

In one embodiment, the beam may also correspond to a reference signal resource (for example, a reference signal resource for beamforming) or beamforming information.

In one embodiment, the beam may also correspond to information associated with a reference signal resource of the network device. The reference signal may be a channel state information reference signal (Channel State Information Reference Signal, CSI-RS), a synchronization signal block (Synchronization Signal block, SS block), a demodulation reference signal (Demodulation Reference Signal, DMRS), a phase tracking signal (Phase Tracking Reference Signal, PTRS), tracking signal (Tracking Reference Signal, TRS), or the like. The information associated with the reference signal resource may be a reference signal resource identifier or QCL information or the like.

The reference signal resource identifier corresponds to a transmit-receive beam pair that is established during measurement based on the reference signal resource. The terminal may infer beam information by using the reference signal resource index.

The QCL information may include at least one of a beam group index number of the reference signal, a resource index number of the reference signal, a port number of the reference signal, and a port group number of the reference signal. Herein, the beam group index number of the reference signal is equivalent to a resource set index number of the reference signal. The resource index number of the reference signal may be a relative index number based on a set of a plurality of resource index numbers. For example, if a terminal reports four absolute resource index numbers {1, 5, 7, 9} of the reference signal, based on the report result of the terminal, a relative resource index number of the reference signal is any one of {0, 1, 2, 3}. The relative resource index number 0 corresponds to the resource index number 1 that is of the reference signal and that is reported by the terminal. The relative resource index number 1 corresponds to the resource index number 5 that is of the reference signal and that is reported by the terminal. The relative resource index number 2 corresponds to the resource index number 7 that is of the reference signal and that is reported by the terminal. The relative resource index number 3 corresponds to the resource index number 9 that is of the reference signal and that is reported by the terminal.

By way of example and without limitation, for example, it may be indicated on the side of the network device that a demodulation reference signal (DMRS) for a PDSCH or a PDCCH and one or more of a plurality of reference signal resources previously reported by the terminal meet a QCL relationship. For example, the reference signal may be a channel state information reference signal (CSI-RS). Herein, each reported CSI-RS resource index corresponds to one transmit-receive beam pair that is previously established during measurement based on the CSI-RS resource. It should be understood that, receive beam information of two reference signals or channels that meet a QCL relationship is the same. Therefore, based on the reference signal resource index, the terminal may infer a receive beam for receiving the PDCCH or the PDSCH.

The foregoing reference signal may be a CSI-RS, an SS block, or another reference signal. A specific type of the reference signal is not limited in the embodiments of this application.

In one embodiment, as described above, the QCL information may also include some spatial characteristic parameters, such as an azimuth angle of departure (AoD), a zenith angle of departure (ZoD), an azimuth angle spread of departure (ASD), a zenith angle spread of departure (ZSD), and parameters related to an angle of arrival, such as an azimuth angle of arrival (AoA), a zenith angle of departure (ZoA), an azimuth angle spread of arrival (ASA), and a zenith angle spread of arrival (ZSA). These spatial characteristic parameters describe spatial channel characteristics of antenna ports for reference signals, and this helps the terminal to complete a receiver-side beamforming process or a receiving processing process based on the QCL information.

2. Beam State Information

Beam state information (BSI) may include reference signal resource index information and reference signal quality information.

In one embodiment, the beam state information may include beam index information and beam quality information.

In one embodiment, the beam state information may include reference signal resource index information, and/or reference signal quality information, and/or index information of a reference signal resource group.

In one embodiment, the beam state information may include a beam index, and/or beam quality information, and/or index information of a beam group.

3. Beam Pair

Beam training means that a terminal device measures a plurality of received beams sent by a network device, selects N (N≥1) best beams from the plurality of beams, and reports the N beams to the network device. The terminal device may report the N beams to the network device by using beam state information BSI, where the BSI may include indexes of the N beams and quality information of the N beams.

Similarly, the network device measures a plurality of beams sent by the terminal device, selects N (N≥1) best beams from the plurality of beams, and notifies the N beams to the terminal device. The network device may notify the N beams to the terminal device by using beam state information BSI, where the BSI may include indexes of the N beams and quality information of the N beams.

By using the beam training process, the network device obtains N best beam pairs (Beam PairLink, BPL) for communication with the terminal device. The beam pair BPL refers to <Bx, B'x> and <By, B'y>, where Bx represents a transmit beam of the network device, B'x represents a receive beam of the terminal device, By represents a transmit beam of the terminal device, and B'y represents a receive beam of the network device. In a subsequent process of communication with the terminal device, the network device performs data transmission by using the N beam pairs BPLs.

It should be understood that the foregoing terms such as "beam", "beam state information", and "beam pair" are merely physical meanings. Implementation of the embodiments of the present invention may be independent of the foregoing terms. For example, beam state information may be merely an index or quality information of a resource, and is referred to as the beam state information only for clarity and differentiation. Implementations in the embodiments are at least for implementing optimization of an information exchange system of an air interface.

Figure 2:
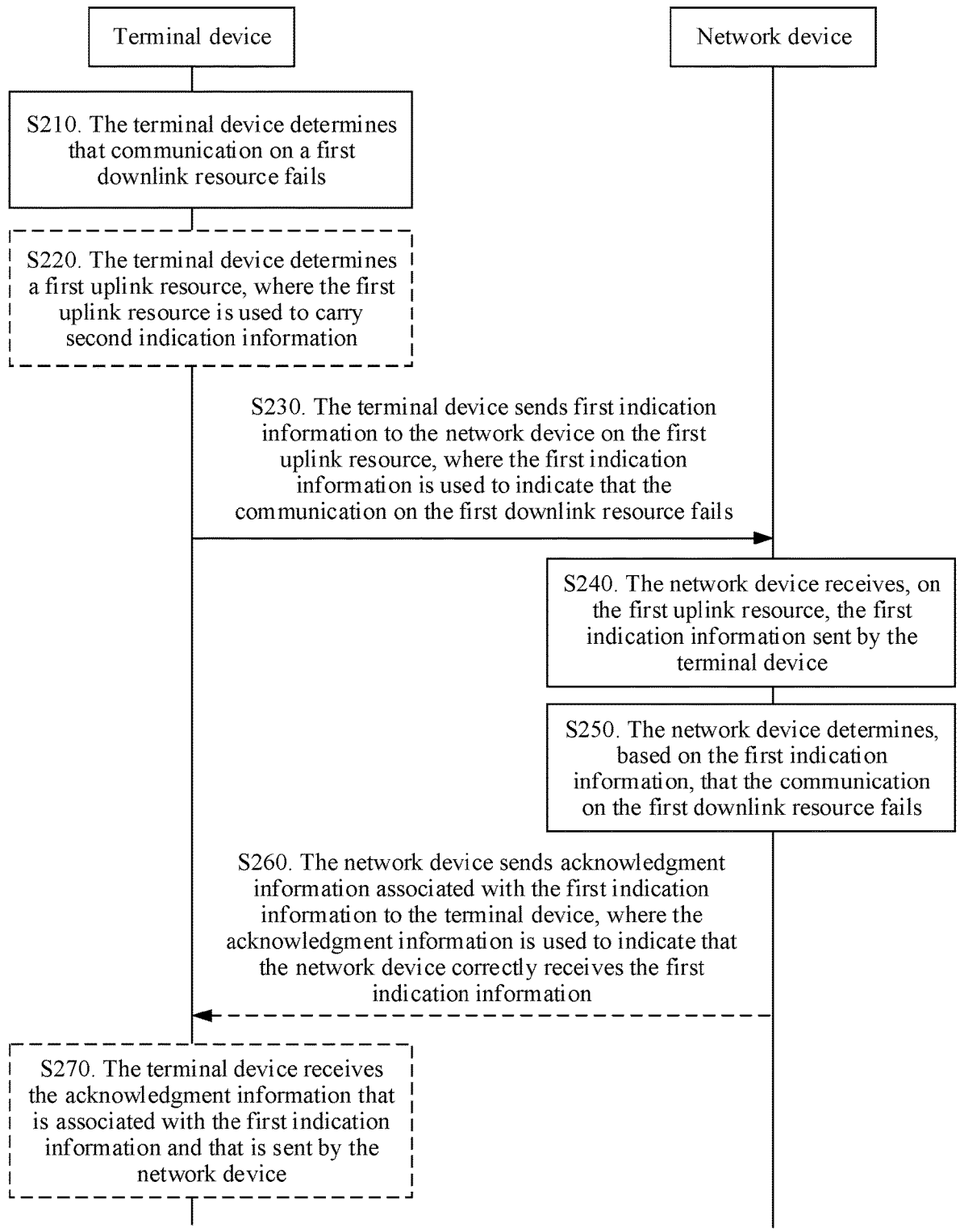
FIG. 2 is a schematic flowchart of an information indication method according to an embodiment of this application.

FIG. 2 is a schematic flowchart of an information indication method 200 according to an embodiment of this application. A terminal device in FIG. 2 may be one of the terminal device 116 or the terminal device 122 in FIG. 1, and a network device in FIG. 2 may be the network device 102 in FIG. 1. Certainly, in an actual system, a quantity of network devices and a quantity of terminal devices may not be limited to an example in this embodiment or in another embodiment. Details are not described below again. The method 200 includes at least the following operations.

S210. The terminal device determines that communication on a first downlink resource fails.

S230. The terminal device sends first indication information to the network device on a first uplink resource, where the first indication information is used to indicate that the communication on the first downlink resource fails, the first uplink resource is a resource used to carry second indication information, and the first uplink resource is a resource allocated by the network device to the terminal device, lengths of respective information bits of the second indication information and the first indication information are the same, but status bits of the information bits are different.

Specifically, the terminal device communicates with the network device by using a configured downlink resource (for example, the first downlink resource). When the terminal device determines that communication with the network device on the first resource fails, the terminal device needs to notify failure of the communication on the first downlink resource to the network device in a timely manner.

In operation S230, the terminal device sends the first indication information to the network device on the first uplink resource, and indicates, to the network device by using the first indication information, that the communication on the first downlink resource fails. The first uplink resource is the resource that is configured for the terminal device and that is used to carry the second indication information. The lengths of the respective information bits of the second indication information and the first indication information are the same, but the status bits of the information bits are different. For example, the lengths of the respective information bits of the first indication information and the second indication information are both 6 bits, the information bits of the first indication information are "000011", and the information bits of the second indication information are "101011".

In this application, when determining that the communication on the first downlink resource fails, the terminal device sends the first indication information to the network device on the resource that carries the second indication information, to indicate, to the network device, that the communication on the first downlink resource fails, so that when communication on a downlink resource fails, no uplink transmission resource needs to be allocated individually to the terminal device to report failure of the communication on the downlink resource, but instead an uplink resource allocated to other indication information (for example, the second indication information) is reused to report failure of the communication on the downlink resource. Therefore, failure of the communication on the downlink resource is notified to the base station in a timely manner, and resource overheads can be reduced.

In one embodiment, the first downlink resource may be a resource configured by the network device for the terminal device, or the first downlink resource may be a resource preconfigured by a system for the terminal device. This is not particularly limited in this application.

It should be understood that implementation of the first downlink resource may alternatively be a resource configured by another network device for the terminal device. In a device-to-device (Device to Device) scenario, the first downlink resource may alternatively be configured by another relay or another terminal device for the terminal device.

The first downlink resource is a resource associated with a physical downlink control channel (PDCCH).

The resource associated with the physical downlink control channel 0 may be a beam pair associated with the physical downlink control channel (PDCCH), or may be a time-frequency resource and/or a spatial resource associated with the physical downlink control channel (PDCCH), or may be a reference signal resource associated with the physical downlink control channel (PDCCH), or may be a resource associated with a reference signal resource associated with the physical downlink control channel (PDCCH). This is not particularly limited in this embodiment of this application.

It should be noted that in regard to the foregoing communication failure, it may be that communication failure occurs when beam quality of a beam used by the network device to send a physical downlink control channel PDCCH and beam quality of a beam used to receive a PDCCH become sufficiently low. In other words, communication failure occurs when quality of a beam pair (BPL) used to send and receive a PDCCH becomes sufficiently low.

That the quality becomes sufficiently low includes: quality of a received signal is less than a preset threshold, or no signal can be received in a preset time window.

In this application, when determining that the communication on the first downlink resource fails, the terminal device sends the first indication information to the network device on the resource that carries the second indication information, to indicate, to the network device, that the communication on the first downlink resource fails, so that when the communication on the first downlink resource fails, no uplink transmission resource needs to be allocated individually to the terminal device to report failure of the communication on the first downlink resource, but instead an uplink resource allocated to other indication information (for example, the second indication information) is reused to report the failure of the communication on the first downlink resource to the network device. Therefore, the failure of the communication on the first downlink resource of the network device is notified in a timely manner, and resource overheads can be reduced.

In one embodiment, the second indication information is beam state information periodically or semi-persistently reported by the terminal device, the beam state information includes N pieces of first index information and/or N pieces of first quality information, the first index information is used to indicate an index of a first reference signal resource, and the first quality information is quality information of a reference signal carried on the first reference signal resource, where N is a positive integer greater than or equal to 1.

It should be understood that the beam state information may be merely a name. To distinguish from a channel state, the beam state information may also be second channel state information, or may be referred to as a state information set, or the like.

Specifically, the second indication information may be beam state information periodically or semi-persistently reported by the terminal device, and the beam state information is used to indicate index information and/or quality information of each of N reference signal resources (for example, the first reference signal resource), where the index information is used to indicate an index of the reference signal resource, and the quality information is used to indicate quality information of a reference signal carried on the reference signal resource.

It should be noted that the quality information includes at least one of the following: reference signal received power (Reference Signal Receiving Power, RSRP), reference signal received quality (RSRQ), a signal-to-noise ratio (SNR), or channel quality indicator information (CQI).

By way of example and without limitation, for example, the beam state information (BSI) includes index information and quality information of two first reference signal resources. Indexes of reference signal resources indicated by the index information of the two first reference signal resources are 2 and 6 respectively. In addition, received power RSRP of a reference signal carried on the first reference signal resource whose index is 2 is −56 dbm, and received power RSRP of a reference signal carried on the first reference signal resource whose index is 6 is −110 dbm.

It should be understood that the index information and the quality information of the reference signal resource may alternatively be in a form of binary bits.

In one embodiment, the N pieces of first index information belong to a same reference signal resource group or belong to M reference signal resource groups, and any two of the N pieces of first index information are different and/or indexes of any two of the M reference signal resource groups are different, where M is an integer greater than 1 and less than or equal to N.

For example, the beam state information includes index information of four first reference signal resources, that is, N=4, and the four pieces of first index information are a CRI 1, a CRI 2, a CRI 3, and a CRI 4. When any two of the N pieces of first index information are different, and the four pieces of first index information belong to a same reference signal resource group: a group 1 {CRI 1, CRI 2, CRI 3, CRI 4}, any two of the four pieces of first index information are different, for example, 00, 01, 10, and 11.

When any two of the N pieces of first index information are different, and indexes of any two of the M reference signal resource groups are different, the four pieces of first index information belong to different reference signal groups: a group 1 and a group 2. When the group 1 includes {CRI 1, CRI 2}, and the group 2 includes {CRI 3, CRI 4}, indexes of the group 1 and the group 2 are different, and any two of the CRI 1, the CRI 2, the CRI 3, or the CRI 4 are different. For example, an index of the group 1 is 0, an index of the group 2 is 1, indexes of the CRI 1 and the CRI 2 are {00, 01}, indexes of the CRI 3 and the CRI 4 are {10, 11}.

When indexes of any two of the M reference signal resource groups are different, indexes of any two reference signal resources in each resource group are different, and the four pieces of index information belong to different reference signal groups: a group 1 and a group 2. When the group 1 includes {CRI 1, CRI 2}, and the group 2 includes {CRI 3, CRI 4}, indexes of the group 1 and the group 2 are different, and any two of the CRI 1, the CRI 2, the CRI 3, or the CRI 4 are different. For example, an index of the group 1 is 0, an index of the group 2 is 1, indexes of the CRI 1 and the CRI 2 are {00, 01}, and indexes of the CRI 3 and the CRI 4 are {10, 11} or {01, 10}.

For another example, the beam state information includes index information and quality information of four first reference signal resources, that is, N=4, the four pieces of first index information are a CRI 1, a CRI 2, a CRI 3, and a CRI 4, and the four pieces of first quality information is RSRP 1, RSRP 2, RSRP 3, and RSRP 4. When the four pieces of first index information and the four pieces of quality information belong to a same reference signal resource group: a group 1 {CRI 1, RSRP 1, CRI 2, RSRP 2, CRI 3, RSRP 3, CRI 4, RSRP 4}, any two of the four pieces of first index information are different, for example, 00, 01, 10, and 11, and any two of the four pieces of first quality information are different, for example.

When the four pieces of first index information and the four pieces of first quality information belong to different reference signal groups: a group 1 and a group 2, the group 1 includes {CRI 1, RSRP 1, CRI 2, RSRP 2}, and the group 2 includes {CRI 3, RSRP 3, CRI 4, RSRP 4}, indexes of the group 1 and group 2 are different, any two of the CRI 1, the CRI 2, the CRI 3, or the CRI 4 are different, and any two of the RSRP 1, the RSRP 2, the RSRP 3, and the RSRP 4 are also different. For example, an index of the group 1 is 0, an index of the group 2 is 1, the CRI 1, the RSRP 1, the CRI 2, and the RSRP 2 are {00, 0000, 01, 0001}, and the CRI 3, the RSRP 3, the CRI 3, and the RSRP 4 are {10, 0010, 11, 0100}.

Specifically, N first reference signal resources indicated by the N pieces of first index information belong to a same reference signal resource group, and any two pieces of first index information in the N first reference signal resources that belong to the same reference signal resource group are different; or the N first reference signal resources indicated by the N pieces of first index information are distributed in M reference signal resource groups, each reference signal resource group includes at least one of the N first reference signal resources, and indexes of any two of the M reference signal resource groups are different.

It should be noted that in this embodiment of this application, there may be an association relationship between the reference signal resource and a beam. In other words, the first reference signal resource may correspond to a first beam. In addition, the downlink resource may also be a reference signal resource, and there is an association relationship between the downlink resource and a beam. For example, the first downlink resource may correspond to a first downlink transmit beam of the network device and a first downlink receive beam of the terminal device.

S240. The network device receives, on the first uplink resource, the first indication information sent by the terminal device, where the first indication information is used to indicate that the communication on the first downlink resource fails, the first uplink resource is the resource used to carry the second indication information, the first uplink resource is the resource allocated by the network device to the terminal device, the lengths of the respective information bits of the second indication information and the first indication information are the same, and the status bits of the information bits are different.

S250. The network device determines, based on the first indication information, that the communication on the first downlink resource fails.

For ease of description, the following uses a beam as an example to describe in detail several implementations of using the first indication information in the technical solutions of this application to indicate, to the network device, that the communication on the first downlink resource (for example, the first beam) fails.

Method 1:

When the terminal device detects that communication on the first beam fails, the terminal device sends first indication information to the network device. The first indication information includes $N_1$ pieces of second index information, and the second index information is used to indicate an index of a second beam (for example, a second reference signal resource).

The $N_1$ pieces of second index information include at least two pieces of same second index information. To be specific, the $N_1$ pieces of second index information may be completely the same or partially the same, and the at least two pieces of same second index information are used to indicate, to the network device, that the communication on the first beam fails.

In one embodiment, the second beam corresponds to a beam (for example, a reference signal resource) detected by the terminal device in a candidate beam set (for example, a reference signal resource set), where channel quality of a reference signal carried on the beam is higher than a preset threshold. When detecting that the communication on the first beam fails, the terminal device determines the second beam from the candidate beam set, where the second beam is used to restore communication between the terminal device and the network device.

For example, when index information of the beam detected by the terminal device in the candidate beam set is a CRI x, quality information of the beam of the beam state information is RSRP x, and content of the beam state information is {CRI 1, RSRP 1, CRI 2, RSRP 2, CRI 3, RSRP 3}, the terminal device sends the first indication information to the network device, where the first indication information includes three pieces of index information of the beam and three pieces of quality information of the beam. For example, content of the first indication information is {CRI x, RSRP x, CRI x, RSRP x, CRI x, RSRP x}, and if the quality information is reported in a differential manner and a first piece of quality information is reference RSRP, the content of the first indication information is {CRI x, RSRP x, CRI x, 0, CRI x, 0}.

Alternatively, the first indication information includes two pieces of index information of the beam, two pieces of quality information of the beam, one piece of index information of the beam of the beam state information, and one piece of quality information of the beam. For example, content of the first indication information is {CRI 1, RSRP 1, CRI x, RSRP x, CRI x, RSRP x}, and if the quality information is reported in a differential manner and a first piece of quality information is reference RSRP, the content of the first indication information is {CRI 1, RSRP 1, CRI x, RSRP x, CRI x, 0}.

When the terminal device determines that the communication on the first beam fails, and the terminal device detects the second beam, the terminal device sends the first indication information to the network device, where the first indication information is used to indicate, to the network device, that the communication on the first beam fails.

In one embodiment, the first indication information may be further used to indicate, to the network device, that the second beam indicated by the at least two pieces of same second index information is a beam used to restore the communication between the terminal device and the network device.

Specifically, when sending the first indication information to the network device, the terminal device adds the at least two pieces of same index information to high bits or low bits of the first indication information. When receiving the first indication information, the network device can determine that the second beam is the beam used to restore the communication between the terminal device and the network device.

For example, when communication failure occurs, if the terminal device detects, in the candidate beam set, that channel quality of a reference signal carried on a beam whose index is 8 is higher than a preset threshold of channel quality, the terminal device reports index information of the beam whose index is 8 to the network device by using the first indication information. In addition, the index information, carried in the first indication information, of the beam whose index is 8 is repeated at least once.

When the network device receives the first indication information sent by the terminal device on the resource that carries the second indication information, if it is detected that the first indication information includes at least two pieces of same index information (for example, indexes indicated by two pieces of same index information are both 8), it can be determined that the communication on the first beam fails.

In one embodiment, for example, the terminal device adds the index information of the beam whose index is 8 to the high bit or the low bit of the first indication information, and then the network device may further determine that the beam whose index is 8 is the beam used to restore the communication between the terminal device and the network device.

In one embodiment, the first indication information may further include $N_1$ pieces of second quality information, and the second quality information is used to indicate quality information of the second beam.

The $N_1$ pieces of second quality information include at least two pieces of same second quality information. To be specific, the $N_1$ pieces of second quality information may be completely the same or partially the same, and the at least two pieces of same second quality information are used to indicate, to the network device, that the communication on the first beam fails.

In one embodiment, the first indication information may further include $N_1$ pieces of second quality information, and the second quality information is used to indicate quality information of the second beam.

The $N_1$ pieces of second quality information include at least one piece of lowest-value second quality information. To be specific, when the second quality information is reported in a differential manner, the $N_1$ pieces of second quality information include reference quality information and differential quality information. In an embodiment, all the differential quality information may be a lowest value, or a part of the differential quality information is a lowest value, and the at least one piece of lowest-value second quality information is used to indicate, to the network device, that the communication on the first beam fails. It should be understood that, in an embodiment of the present invention, the lowest value represents zero, a minimum value of the quality information, or a minimum value of all possible values of the differential quality information. In one embodiment, the lowest value may be represented by a special status bit that indicates a binary status bit of the differential quality information. For example, binary status bits are all zeros or all ones. The reference quality information may be determined based on quality information of a reference signal. Specifically, for example, a maximum value, a minimum value, an average value, or the like of quality information of reference signals may be used as the reference quality information, and the differential quality information is a differential value between the reference quality information and other reference signal quality information.

In one embodiment, the second beam corresponds to a beam (for example, a reference signal resource) detected by the terminal device in a candidate beam set (for example, a reference signal resource set), where channel quality of a reference signal carried on the beam is higher than a preset threshold. When detecting that the communication on the first beam fails, the terminal device determines the second beam from the candidate beam set, where the second beam is used to restore communication between the terminal device and the network device.

When the terminal device determines that the communication on the first beam fails, and the terminal device detects the second beam, the terminal device sends the first indication information to the network device, where the first indication information is used to indicate, to the network device, that the communication on the first beam fails.

In one embodiment, the first indication information may be further used to indicate the at least two pieces of same second quality information to the network device, the second quality information is used to indicate quality information of the second beam, and the second beam is a beam used to restore the communication between the terminal device and the network device. Specifically, when sending the first indication information to the network device, the terminal device adds the at least two pieces of same quality information to high bits or low bits of the first indication information. When receiving the first indication information, the network device can determine that the second beam is the beam used to restore the communication between the terminal device and the network device.

For example, when communication failure occurs, if the terminal device detects, in the candidate beam set, that channel quality of a reference signal carried on a beam whose index is 6 is higher than a preset threshold of channel quality, the terminal device reports quality information of the beam whose index is 6 to the network device by using the first indication information. In addition, the quality information, carried in the first indication information, of the beam whose index is 6 is repeated at least once.

When the network device receives the first indication information sent by the terminal device on the resource that carries the second indication information, if it is detected that the first indication information includes at least two pieces of same quality information, it can be determined that the communication on the first beam fails.

In one embodiment, for example, the terminal device adds the quality information of the beam whose index is 6 to the high bit of the first indication information; the network device first determines, based on the at least two pieces of same quality information carried in the high bit of the first indication information, that a beam corresponding to the at least two pieces of same quality information is the beam used to restore the communication between the terminal device and the network device, and further determines, based on two pieces of same index information corresponding to the quality information, that the second beam is the beam whose index is 6.

In one embodiment, the first indication information may be further used to indicate the at least one piece of lowest-value second quality information to the network device, the second quality information is used to indicate quality information of the second beam, and the second beam is a beam used to restore the communication between the terminal device and the network device.

Specifically, when sending the first indication information to the network device, the terminal device adds the at least one piece of lowest-value quality information to a high bit or a low bit of the first indication information. When receiving the first indication information, the network device can determine that the second beam is the beam used to restore the communication between the terminal device and the network device.

For example, when communication failure occurs, if the terminal device detects, in the candidate beam set, that channel quality of a reference signal carried on a beam whose index is 6 is higher than a preset threshold of channel quality, the terminal device reports quality information of the beam whose index is 6 to the network device by using the first indication information. In addition, the quality information, carried in the first indication information, of the beam whose index is 6 is repeated at least once. If the quality information is reported in a differential manner, at least one piece of reference quality information and at least one piece of lowest-value differential quality information are reported.

When the network device receives the first indication information sent by the terminal device on the resource that carries the second indication information, if it is detected that the first indication information includes at least one piece of lowest-value quality information, it can be determined that the communication on the first beam fails.

In one embodiment, for example, the terminal device adds the quality information of the beam whose index is 6 to the high bit of the first indication information; the network device first determines, based on the at least one piece of lowest-value quality information carried in the high bit of the first indication information, that a beam corresponding to the at least one piece of lowest-value quality information is the beam used to restore the communication between the terminal device and the network device, and further determines, based on two pieces of same index information corresponding to the quality information, that the second beam is the beam whose index is 6.

In one embodiment, the network device may further determine, based on a bit of the quality information of the second beam, that beam failure occurs on the first beam.

For example, if a bit, included in the first indication information, of the quality information of the second beam is a special status bit, for example, RSRP of the second beam is 0 or −140 dbm, the network device may determine, based on the RSRP of the second beam, that the communication on the first beam fails. Further, if the first indication information further includes index information of the second indication information, the network device may further determine that the second beam is a beam used to restore the communication between the terminal device and the network device.

It should be understood that, that the RSRP of the second beam is 0 or −140 is merely an example for description, and the RSRP of the second beam may alternatively be another predefined value. This is not particularly limited in this application.

It should be noted that the quantity $N_1$ of pieces of second index information included in the first indication information needs to be less than or equal to the quantity N of pieces of first index information included in the second indication information, and $N_1$ second reference signal resources indicated by the $N_1$ pieces of second index information belong to a same reference signal resource group.

Method 2:

When the terminal device detects that communication on the first beam fails, the terminal device sends first indication information to the network device. The first indication information includes $N_2$ pieces of third index information, and the third index information is used to indicate an index of a third beam (for example, a third reference signal resource).

The $N_2$ pieces of third index information include at least two pieces of same second index information. To be specific, the $N_2$ pieces of third index information may be completely the same or partially the same, and the at least two pieces of same third index information are used to indicate, to the network device, that the communication on the first beam fails.

In one embodiment, the third beam corresponds to a beam (for example, a reference signal resource) associated with control channel spatial quasi-co-location assumption information (QCL) configured by the network device for the terminal device, and quality information of the third beam is less than a preset threshold.

In one embodiment, a bit of the quality information of the third beam is a special status bit, the special status bit includes either a null indication or a lowest indication bit of quality information, and the special status bit is used to indicate that communication on the first beam fails.

For example, the quality information of the third beam is reference signal received power RSRP, the null indication corresponds to the quality information RSRP of the third beam being 0, and the lowest indication bit corresponds to the quality information RSRP of the third beam being −140.

When the terminal device determines that the communication on the first beam fails, and the terminal device detects the third beam, the terminal device sends the first indication information to the network device, where the first indication information is used to indicate, to the network device, that the communication on the first beam fails.

For example, when communication failure occurs, if the terminal device detects that channel quality of a reference signal carried on a beam whose index is 5 is lower than a preset threshold of channel quality, the terminal device reports index information of the beam whose index is 5 to the network device by using the first indication information. In addition, the index information, carried in the first indication information, of the beam whose index is 5 is repeated at least once.

For example, when the terminal device detects that index information of a beam on which communication failure occurs is a CRI s, quality information of a beam of the beam state information is RSRP s, and content of the beam state information is {CRI 1, RSRP 1, CRI 2, RSRP 2, CRI 3, and RSRP 3}, the terminal device sends the first indication information to the network device, where the first indication information includes three pieces of index information of the beam and three pieces of quality information of the beam. For example, the content of the first indication information is {CRI s, 0, CRI s, 0, CRI s, 0}.

Alternatively, the first indication information includes two pieces of index information of the beam, two pieces of quality information of the beam, one piece of index information of the beam of the beam state information, and one piece of quality information of the beam. For example, content of the first indication information is {$CRI_1$, $RSRP_1$, CRI s, 0, CRI s, 0}.

In one embodiment, the third beam is the first beam.

Specifically, when detecting that the communication on the first beam fails, the terminal device adds index information of the first beam to the first indication information, and make the index information of the first beam repeat at least once.

When the network device receives the first indication information sent by the terminal device on the resource that carries the second indication information, if it is detected that the first indication information includes at least two pieces of same index information, it can be determined that the communication on the first beam fails.

In one embodiment, the first indication information may further include $N_2$ pieces of third quality information, and the third quality information is used to indicate quality information of the third beam.

The $N_2$ pieces of third quality information include at least two pieces of same third quality information. To be specific, the $N_2$ pieces of third quality information may be completely the same or partially the same, and the at least two pieces of same third quality information are used to indicate, to the network device, that the communication on the first beam fails.

When the terminal device determines that the communication on the first beam fails, and the terminal device detects the third beam, the terminal device sends the first indication information to the network device, where the first indication information is used to indicate, to the network device, that the communication on the first beam fails.

For example, when communication failure occurs, if the terminal device detects, in the candidate beam set, that channel quality of a reference signal carried on a beam whose index is 9 is higher than a preset threshold of channel quality, the terminal device reports quality information of the beam whose index is 9 to the network device by using the first indication information. In addition, the quality information, carried in the first indication information, of the beam whose index is 9 is repeated at least once.

When the network device receives the first indication information sent by the terminal device on the resource that carries the second indication information, if it is detected that the first indication information includes at least two pieces of same quality information, it can be determined that the communication on the first beam fails.

In one embodiment, the first indication information may further include $N_2$ pieces of third quality information, and the third quality information is used to indicate quality information of the third beam.

The $N_2$ pieces of third quality information include at least one piece of lowest-value third quality information. To be specific, the $N_2$ pieces of third quality information include reference quality information and differential quality information, where the differential quality information may be completely a lowest value or partially a lowest value, and the at least one piece of lowest-value third quality information is used to indicate, to the network device, that the communication on the first beam fails.

When the terminal device determines that the communication on the first beam fails, and the terminal device detects the third beam, the terminal device sends the first indication information to the network device, where the first indication information is used to indicate, to the network device, that the communication on the first beam fails.

For example, when communication failure occurs, if the terminal device detects, in the candidate beam set, that channel quality of a reference signal carried on a beam whose index is 9 is higher than a preset threshold of channel quality, the terminal device reports quality information of the beam whose index is 9 to the network device by using the first indication information. In addition, a differential value of the quality information, carried in the first indication information, of the beam whose index is 9 is repeated at least once. If the quality information is reported in a differential manner, at least one piece of reference quality information and at least one piece of lowest-value differential quality information are reported.

When the network device receives the first indication information sent by the terminal device on the resource that carries the second indication information, if it is detected that the first indication information includes at least one piece of lowest-value quality information, it can be determined that the communication on the first beam fails.

In one embodiment, the network device may further determine, based on a bit of the quality information of the third beam, that beam failure occurs on the first beam.

For example, if a bit, included in the first indication information, of the quality information of the third beam is a special status bit, for example, RSRP of the third beam is 0 or −140 dbm, the network device may determine, based on the RSRP of the third beam, that the communication on the first beam fails. Further, if the first indication information further includes index information of the third indication information, the network device may further determine an index number of the beam on which the communication failure occurs.

It should be understood that, that the RSRP of the third beam is 0 or −140 is merely an example for description, and the RSRP of the third beam may alternatively be another predefined value. This is not particularly limited in this application.

It should be noted that the quantity $N_2$ of pieces of third index information included in the first indication information needs to be less than or equal to the quantity N of pieces of first index information included in the second indication information, and $N_2$ second reference signal resources indicated by the $N_2$ pieces of third index information belong to a same reference signal resource group.

Method 3:

The method 3 may be considered as a combination of the method 2 and the method 3. To be specific, when determining that communication on the first beam fails, the terminal device sends the first indication information to the network device, where the first indication information includes not only $N_1$ pieces of second index information and/or $N_1$ pieces of second quality information, but also $N_2$ pieces of third index information and/or $N_2$ pieces of third quality information. How to indicate, to the network device by using the first indication information in the method 3, that the communication on the first beam fails has been described in detail in the method 1 and the method 2. For brevity, only a simple example is provided herein.

For example, when index information of the beam detected by the terminal device in the candidate beam set is a CRI x, quality information of the beam of the beam state information is RSRP x, and the terminal device detects that index information of a beam on which communication failure occurs is a CRI s, quality information of the beam of the beam state information is RSRP s, and content of the beam state information is {CRI 1, RSRP 1, CRI 2, RSRP 2, CRI 3, and RSRP 3}, the terminal device sends the first indication information to the network device. For example, the content of the first indication information is {CRI s, 0, CRI s, 0, CRI x, RSRP x}.

It should be noted that a sum of the quantity $N_1$ of pieces of second index information included in the first indication information and the quantity $N_2$ of pieces of third index information included in the first indication information needs to be less than or equal to N.

It should be noted that the foregoing several methods are merely examples for description, and the embodiments of this application are not limited thereto. Any other method obtained by combining the foregoing several methods falls within the protection scope of this application.

It should be understood that in this application, N, $N_1$, and $N_2$ may be configured by the network device, or may be predefined. This is not particularly limited in this application.

By way of example and without limitation, in this application, the first uplink resource may be a periodic or semi-persistent physical uplink control channel PUCCH resource.

This application further includes the following several implementations of indicating, to the network device, that the communication on the first downlink resource (for example, the first beam) fails.

Method 4:

The first indication information may alternatively be information obtained by jointly encoding the beam state information and beam failure recovery request information, and the beam failure recovery request information is used to indicate that communication on the first beam fails.

The beam state information and the beam failure recovery request information are jointly encoded, and the encoded first indication information is sent to the network device on the resource that carries the beam state information, so that based on the first indication information, the network device can not only determine the beam state information, but also can determine that the communication on the first beam fails. Therefore, failure of the communication on the first beam is notified to the base station in a timely manner, and resource overheads can be reduced.

Method 5:

The first indication information may alternatively be beam failure recovery request information. In this case, an information indication bit needs to be added (for example, one information bit is added) to indicate, to a network, that the first indication information is the beam failure recovery request information, so that the network device determines, based on the first indication information, that the communication on the first beam fails. Therefore, failure of the communication on the first beam is notified to the base station in a timely manner, and resource overheads can be reduced.

Method 6:

The first indication information is channel state information CSI.

Specifically, when the first indication information is channel state information CSI, the terminal device sends the first indication information to the network device on a resource that carries the channel state information CSI, where the first indication information is used to indicate, to the network device, that the communication on the first beam fails.

Method 7:

A redundant status bit or a special status bit of the channel state information CSI carries the beam failure recovery request information, and the beam failure recovery request information is used to indicate that the communication on the first beam fails.

The beam failure recovery request information is carried by the redundant status bit or the special status bit of the channel state information, and the first indication information is sent to the network device on the resource that carries the channel state information, so that the network device determines, based on the first indication information, that the communication on the first beam fails. Therefore, failure of the communication on the first beam is notified to the base station in a timely manner, and resource overheads can be reduced. The special status bit may be a status bit with a CQI being 0, which is not limited herein.

Method 8:

The first indication information is information obtained by jointly encoding the channel state information and beam failure recovery request information, and the beam failure recovery request information is used to indicate that communication on the first beam fails.

The channel state information and the beam failure recovery request information are jointly encoded, and the encoded first indication information is sent to the network device on the resource that carries the channel state information, so that based on the first indication information, the network device can not only determine the channel state information, but also can determine that communication on a beam fails. Therefore, failure of communication on a beam is notified to the base station in a timely manner, and resource overheads can be reduced.

It should be understood that the failure of the communication on the beam in the embodiments of the present invention fails may be replaced by other embodiments. For example, it may be that communication on a resource fails, or communication on a reference signal fails, and a corresponding beam index may be a resource index or a reference signal index.

In this embodiment of this application, before operation S230, the method may further include operation S220.

S220. The terminal device determines the first uplink resource that carries the second indication information.

Specifically, when determining that communication failure occurs, the terminal device may first determine a resource that carries the second indication information, and send the first indication information to the network device on an uplink resource (for example, the first uplink resource) that carries the second indication information.

In another embodiment, S220 may alternatively be prior to S210. To be specific, the terminal device determines the first uplink resource; after S220, the terminal device determines that the communication on the first downlink resource fails, and sends the first indication information to the network device on the first uplink resource.

By way of example and without limitation, the terminal device may receive configuration information sent by the network device, where the configuration information is used to indicate a resource that carries the second indication information. The terminal device determines, based on the configuration information, the resource that carries the second indication information.

In this embodiment of this application, after operation S250, the method may further include operations S260 and S270.

S260. The network device sends acknowledgment information associated with the first indication information to the terminal device, where the acknowledgment information is used to indicate that the network device correctly receives the first indication information.

S270. The terminal device receives the acknowledgment information that is associated with the first indication information and that is sent by the network device, where the acknowledgment information is used to indicate that the network device correctly receives the first indication information.

The foregoing describes, with reference to FIG. 2, the information indication method provided in the embodiments of this application. The following describes, with reference to FIG. 3 and FIG. 6, a terminal device and a network device provided in the embodiments of this application.

Figure 3:
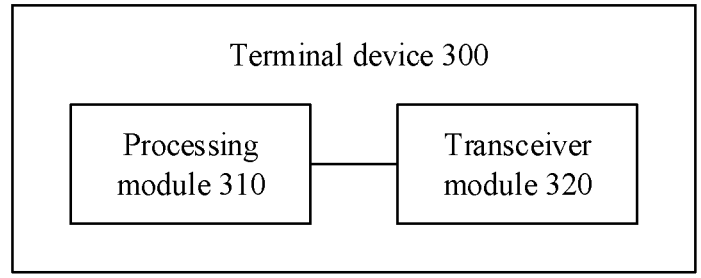
FIG. 3 is a schematic block diagram of a terminal device according to an embodiment of this application.

FIG. 3 is a schematic block diagram of a terminal device 300 according to an embodiment of this application. The terminal device 300 includes:

a processing module 310, configured to determine that communication on a first downlink resource fails, where the first downlink resource is a resource configured by a network device for the terminal device; and a transceiver module 320, configured to send first indication information to the network device on a first uplink resource, where the first indication information is used to indicate that the communication on the first downlink resource fails, the first uplink resource is a resource used to carry second indication information, and the first uplink resource is a resource allocated by the network device to the terminal device, lengths of respective information bits of the second indication information and the first indication information are the same, but status bits of the information bits are different.

In one embodiment, the first uplink resource is a periodic or semi-persistent physical uplink control channel PUCCH resource.

In one embodiment, the second indication information is beam state information periodically or semi-persistently reported by the terminal device, the beam state information includes N pieces of first index information and/or N pieces of first quality information, the first index information is used to indicate an index of a first reference signal resource, the first quality information is quality information of a reference signal carried on the first reference signal resource, and the first reference signal resource is used for beam measurement, where N is a positive integer greater than or equal to 1.

In one embodiment, the N pieces of first index information belong to a same reference signal resource group or belong to M reference signal resource groups, and any two of the N pieces of first index information are different and/or indexes of any two of the M reference signal resource groups are different, where M is an integer greater than 1 and less than or equal to N.

In one embodiment, the first indication information includes $N_1$ pieces of second index information and/or $N_1$ pieces of second quality information, the second index information is used to indicate an index of a second reference signal resource, the second quality information is quality information of a reference signal carried on the second reference signal resource, and $N_1$ second reference signal resources indicated by the $N_1$ pieces of second index information belong to a same reference signal resource group, where $N_1$ is a positive integer greater than 1 and less than or equal to N.

In one embodiment, the second reference signal resource is associated with a beam that is determined by the terminal device and that is used to restore communication between the terminal device and the network device, or the second reference signal resource corresponds to a reference signal resource detected by the terminal device in a candidate reference signal resource set, where channel quality of a reference signal carried on the reference signal resource is higher than a preset threshold.

In one embodiment, the $N_1$ pieces of second index information include at least two pieces of same second index information, and the at least two pieces of same second index information are used to indicate that the communication on the first downlink resource fails; and/or the at least two pieces of same second index information are used to indicate the beam that is determined by the terminal device and that is used to restore the communication between the terminal device and the network device, or the at least two pieces of same second index information are used to indicate an index of the reference signal resource detected by the terminal device in the candidate reference signal resource set, where the channel quality of the reference signal carried on the reference signal resource is higher than the preset threshold.

In one embodiment, the $N_1$ pieces of second quality information include at least two pieces of same second quality information, and the at least two pieces of same second quality information are used to indicate that the communication on the first downlink resource fails; and/or the at least two pieces of same second quality information are used to indicate the beam that is determined by the terminal device and that is used to restore the communication between the terminal device and the network device, or the at least two pieces of same second quality information are used to indicate quality information of the reference signal resource detected by the terminal device in the candidate reference signal resource set, where the channel quality of the reference signal carried on the reference signal resource is higher than the preset threshold.

In one embodiment, the $N_1$ pieces of second quality information include at least one piece of lowest-value second quality information, and the at least two pieces of same second quality information are used to indicate that the communication on the first downlink resource fails; and/or the at least two pieces of same second quality information are used to indicate the beam that is determined by the terminal device and that is used to restore the communication between the terminal device and the network device, or the at least two pieces of same second quality information are used to indicate quality information of the reference signal resource detected by the terminal device in the candidate reference signal resource set, where the channel quality of the reference signal carried on the reference signal resource is higher than the preset threshold.

In one embodiment, any two of the $N_1$ pieces of second index information are the same, and the any two pieces of same second index information are used to indicate that the communication on the first downlink resource fails; and/or the any two pieces of same second index information are used to indicate the beam that is determined by the terminal device and that is used to restore the communication between the terminal device and the network device, or the any two pieces of same second index information are used to indicate the index of the reference signal resource detected by the terminal device in the candidate reference signal resource set, where the channel quality of the reference signal carried on the reference signal resource is higher than the preset threshold; and/or any two of the $N_1$ pieces of second quality information are the same, and the any two pieces of same second quality information are used to indicate that the communication on the first downlink resource fails; and/or the any two pieces of same second quality information are used to indicate the beam that is determined by the terminal device and that is used to restore the communication between the terminal device and the network device, or the any two pieces of same second quality information are used to indicate the quality information of the reference signal resource detected by the terminal device in the candidate reference signal resource set, where the channel quality of the reference signal carried on the reference signal resource is higher than the preset threshold.

In one embodiment, any two of the $N_1$ pieces of second index information are the same, and the any two pieces of same second index information are used to indicate that the communication on the first downlink resource fails; and/or the any two pieces of same second index information are used to indicate the beam that is determined by the terminal device and that is used to restore the communication between the terminal device and the network device, or the any two pieces of same second index information are used to indicate the index of the reference signal resource detected by the terminal device in the candidate reference signal resource set, where the channel quality of the reference signal carried on the reference signal resource is higher than the preset threshold; and/or the $N_1$ pieces of second quality information include $N_1$-1 or $N_1$-2 pieces of lowest-value second quality information, and the $N_1$-1 or $N_1$-2 pieces of lowest-value second quality information are used to indicate that the communication on the first downlink resource fails; and/or the $N_1$-1 or $N_1$-2 pieces of lowest-value second quality information are used to indicate the beam that is determined by the terminal device and that is used to restore the communication between the terminal device and the network device, or the $N_1$-1 or $N_1$-2 pieces of lowest-value second quality information are used to indicate the quality information of the reference signal resource detected by the terminal device in the candidate reference signal resource set, where the channel quality of the reference signal carried on the reference signal resource is higher than the preset threshold.

In one embodiment, the first indication information includes $N_2$ pieces of third index information and/or $N_2$ pieces of third quality information, the third index information is used to indicate an index of a third reference signal resource, the third quality information is quality information of a reference signal carried on the third reference signal resource, channel quality of the third quality information is lower than a preset threshold, the third reference signal resource corresponds to a reference signal resource that is associated with control channel spatial QCL configured by the network device for the terminal device, and $N_2$ third reference signal resources indicated by the $N_2$ pieces of third index information belong to a same reference signal resource group, where $N_2$ is a positive integer greater than or equal to 1 and less than or equal to N.

In one embodiment, the $N_2$ pieces of third index information include at least two pieces of same third index information, and the at least two pieces of same third index information are used to indicate that the communication on the first downlink resource fails; and/or the $N_2$ pieces of third quality information include at least two pieces of same third quality information, and the at least two pieces of same third quality information are used to indicate that the communication on the first downlink resource fails.

In one embodiment, the $N_2$ pieces of third index information include at least two pieces of same third index information, and the at least two pieces of same third index information are used to indicate that the communication on the first downlink resource fails; and/or the $N_2$ pieces of third quality information include at least one piece of lowest-value third quality information, and the at least one piece of lowest-value third quality information is used to indicate that the communication on the first downlink resource fails.

In one embodiment, any two of the $N_2$ pieces of third index information are the same, and the any two pieces of same third index information are used to indicate that the communication on the first downlink resource fails; and/or the $N_2$ pieces of third quality information are completely the same, and the any two pieces of same third quality information are used to indicate that the communication on the first downlink resource fails.

In one embodiment, any two of the $N_2$ pieces of third index information are the same, and the any two pieces of same third index information are used to indicate that the communication on the first downlink resource fails; and/or the $N_2$ pieces of third quality information include $N_2$-1 or $N_2$-2 pieces of lowest-value third quality information, and the $N_2$-1 or $N_2$-2 pieces of lowest-value third quality information are used to indicate that the communication on the first downlink resource fails.

In one embodiment, bits of the $N_2$ pieces of third quality information are special status bits, the special status bit includes either a null indication or a lowest indication bit of quality information, and the special status bit is used to indicate that the communication on the first downlink resource fails.

In one embodiment, the first indication information includes first parameter information and second parameter information, the first parameter information includes the $N_1$ pieces of second index information and/or the $N_1$ pieces of second quality information, and the second parameter information includes the $N_2$ pieces of third index information and/or the $N_2$ pieces of third quality information, where the $N_1$ pieces of second index information include at least two pieces of same second index information, and the at least two pieces of same second index information are used to indicate that the communication on the first downlink resource fails; and/or the $N_1$ pieces of second quality information include at least two pieces of same second quality information, and the at least two pieces of same second quality information are used to indicate that the communication on the first downlink resource fails; and/or the $N_2$ pieces of third index information include at least two pieces of same third index information, and the at least two pieces of same third index information are used to indicate that the communication on the first downlink resource fails; and/or the $N_2$ pieces of third quality information include at least two pieces of same third quality information, and the at least two pieces of same third quality information are used to indicate that the communication on the first downlink resource fails; and/or a bit of at least one of the $N_1$ pieces of second quality information is a special status bit, and the special status bit is used to indicate that the communication on the first downlink resource fails; and/or a bit of at least one of the $N_2$ pieces of third quality information is a special status bit, and the special status bit is used to indicate that the communication on the first downlink resource fails, where $N_1+N_2 \leq N$.

In one embodiment, the first indication information includes first parameter information and second parameter information, the first parameter information includes the $N_1$ pieces of second index information and/or the $N_1$ pieces of second quality information, and the second parameter information includes the $N_2$ pieces of third index information and/or the $N_2$ pieces of third quality information, where the $N_1$ pieces of second index information include at least two pieces of same second index information, and the at least two pieces of same second index information are used to indicate that the communication on the first downlink resource fails; and/or the $N_1$ pieces of second quality information include at least one piece of lowest-value second quality information, and the at least one piece of lowest-value second quality information is used to indicate that the communication on the first downlink resource fails; and/or the $N_2$ pieces of third index information include at least two pieces of same third index information, and the at least two pieces of same third index information are used to indicate that the communication on the first downlink resource fails; and/or the $N_2$ pieces of third quality information include at least one piece of lowest-value third quality information, and the at least one piece of lowest-value third quality information is used to indicate that the communication on the first downlink resource fails; and/or a bit of at least one of the $N_1$ pieces of second quality information is a special status bit, and the special status bit is used to indicate that the communication on the first downlink resource fails; and/or a bit of at least one of the $N_2$ pieces of third quality information is a special status bit, and the special status bit is used to indicate that the communication on the first downlink resource fails, where $N_1+N_2 \leq N$.

In one embodiment, the first indication information includes first parameter information and second parameter information, the first parameter information includes the $N_1$ pieces of second index information and/or the $N_1$ pieces of second quality information, and the second parameter information includes the $N_2$ pieces of third index information and/or the $N_2$ pieces of third quality information, where the $N_1$ pieces of second index information include at least two pieces of same second index information, and the at least two pieces of same second index information are used to indicate that the communication on the first downlink resource fails; and/or the $N_1$ pieces of second quality information include $N_1$-1 or $N_1$-2 pieces of lowest-value second quality information, and the $N_1$-1 or $N_1$-2 pieces of lowest-value second quality information are used to indicate that the communication on the first downlink resource fails; and/or the $N_2$ pieces of third index information include at least two pieces of same third index information, and the at least two pieces of same third index information are used to indicate that the communication on the first downlink resource fails; and/or the $N_2$ pieces of third quality information include $N_2$-1 or $N_2$-2 pieces of lowest-value third quality information, and the $N_2$-1 or $N_2$-2 pieces of lowest-value third quality information are used to indicate that the communication on the first downlink resource fails; and/or a bit of at least one of the $N_1$ pieces of second quality information is a special status bit, and the special status bit is used to indicate that the communication on the first downlink resource fails; and/or a bit of at least one of the $N_2$ pieces of third quality information is a special status bit, and the special status bit is used to indicate that the communication on the first downlink resource fails, where $N_1+N_2 \leq N$.

In one embodiment, the first indication information includes first parameter information and second parameter information, the first parameter information includes the $N_1$ pieces of second index information and/or the $N_1$ pieces of second quality information, and the second parameter information includes the $N_2$ pieces of third index information and/or the $N_2$ pieces of third quality information, where the $N_1$ pieces of second index information include any two pieces of same second index information, and the any two pieces of same second index information are used to indicate that the communication on the first downlink resource fails; and/or the $N_1$ pieces of second quality information include $N_1$-1 or $N_1$-2 pieces of lowest-value second quality information, and the $N_1$-1 or $N_1$-2 pieces of lowest-value second quality information are used to indicate that the communication on the first downlink resource fails; and/or the $N_2$ pieces of third index information include any two pieces of same third index information, and the any two pieces of same third index information are used to indicate that the communication on the first downlink resource fails; and/or the $N_2$ pieces of third quality information include $N_2$-1 or $N_2$-2 pieces of lowest-value third quality information, and the $N_2$-1 or $N_2$-2 pieces of lowest-value third quality information are used to indicate that the communication on the first downlink resource fails; and/or a bit of at least one of the $N_1$ pieces of second quality information is a special status bit, and the special status bit is used to indicate that the communication on the first downlink resource fails; and/or a bit of at least one of the $N_2$ pieces of third quality information is a special status bit, and the special status bit is used to indicate that the communication on the first downlink resource fails, where $N_1+N_2 \leq N$.

In one embodiment, N, $N_1$, and $N_2$ are configured by the network device, or N, $N_1$, and $N_2$ are predefined.

In one embodiment, the transceiver module 320 is further configured to:

receive the acknowledgment information that is associated with the first indication information and that is sent by the network device, where the acknowledgment information is used to indicate that the network device correctly receives the first indication information.

It should be understood that, the processing module 310 in this embodiment of the present invention may be implemented by a processor or a circuit component related to a processor, and the transceiver module 320 may be implemented by a transceiver or a circuit component related to a transceiver.

Figure 4:
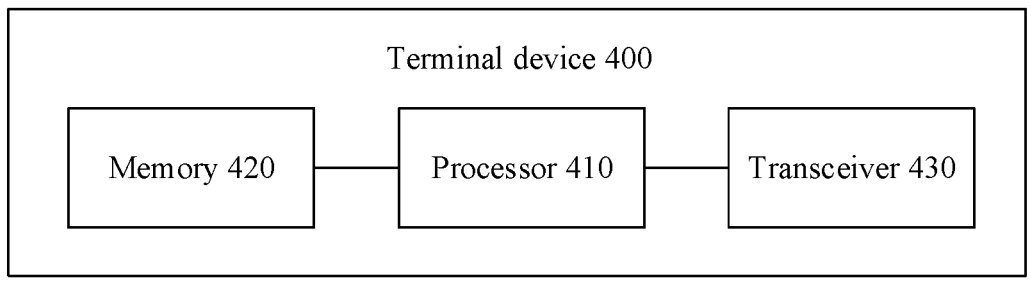
FIG. 4 is another schematic block diagram of a terminal device according to an embodiment of this application.

As shown in FIG. 4, an embodiment of this application further provides a terminal device 400. The terminal device 400 includes a processor 410, a memory 420, and a transceiver 430. The memory 420 stores an instruction or a program, and the processor 430 is configured to execute the instruction or the program stored in the memory 420. When the instruction or the program stored in the memory 420 is executed, the processor 410 is configured to perform an operation performed by the processing module 310 in the foregoing embodiment, and the transceiver 430 is configured to perform an operation performed by the transceiver module 320 in the foregoing embodiment.

Figure 5:
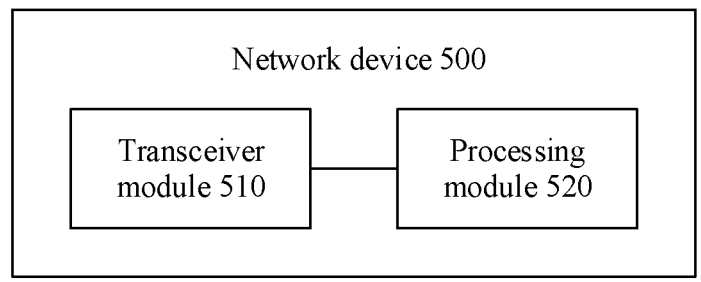
FIG. 5 is a schematic block diagram of a network device according to an embodiment of this application.

FIG. 5 is a schematic flowchart of a network device 500 according to an embodiment of this application. The network device 500 includes:

a transceiver module 510, configured to receive, on a first uplink resource, first indication information sent by a terminal device, where the first indication information is used to indicate that communication on the first downlink resource fails, the first uplink resource is a resource used to carry second indication information, the first uplink resource is a resource allocated by the network device to the terminal device, lengths of respective information bits of the second indication information and the first indication information are the same, but status bits of the information bits are different; and a processing module 520, configured to determine, based on the first indication information, that the communication on the first downlink resource fails.

In one embodiment, the first uplink resource is a periodic or semi-persistent physical uplink control channel PUCCH resource.

In one embodiment, the second indication information is beam state information periodically or semi-persistently reported by the terminal device, the beam state information includes N pieces of first index information and/or N pieces of first quality information, the first index information is used to indicate an index of a first reference signal resource, the first quality information is quality information of a reference signal carried on the first reference signal resource, and the first reference signal resource is used for beam measurement, where N is a positive integer greater than or equal to 1.

In one embodiment, the N pieces of first index information belong to a same reference signal resource group or belong to M reference signal resource groups, and any two of the N pieces of first index information are different and/or indexes of any two of the M reference signal resource groups are different, where M is an integer greater than 1 and less than or equal to N.

In one embodiment, the first indication information includes $N_1$ pieces of second index information and/or $N_1$ pieces of second quality information, the second index information is used to indicate an index of a second reference signal resource, the second quality information is quality information of a reference signal carried on the second reference signal resource, and $N_1$ second reference signal resources indicated by the $N_1$ pieces of second index information belong to a same reference signal resource group, where $N_1$ is a positive integer greater than 1 and less than or equal to N.

In one embodiment, the second reference signal resource is associated with a beam that is determined by the terminal device and that is used to restore communication between the terminal device and the network device, or the second reference signal resource corresponds to a reference signal resource detected by the terminal device in a candidate reference signal resource set, where channel quality of a reference signal carried on the reference signal resource is higher than a preset threshold.

In one embodiment, the $N_1$ pieces of second index information include at least two pieces of same second index information, and the at least two pieces of same second index information are used to indicate the beam that is determined by the terminal device and that is used to restore the communication between the terminal device and the network device, or the at least two pieces of same second index information are used to indicate an index of the reference signal resource detected by the terminal device in the candidate reference signal resource set, where the channel quality of the reference signal carried on the reference signal resource is higher than the preset threshold; and the processing module 520 is further configured to:

determine, based on the at least two pieces of same second index information, that the communication on the first downlink resource fails.

In one embodiment, the $N_1$ pieces of second quality information include at least two pieces of same second quality information, and the at least two pieces of same second quality information are used to indicate the beam that is determined by the terminal device and that is used to restore the communication between the terminal device and the network device, or the at least two pieces of same second quality information are used to indicate quality information of the reference signal resource detected by the terminal device in the candidate reference signal resource set, where the channel quality of the reference signal carried on the reference signal resource is higher than the preset threshold; and the processing module 520 is further configured to:

determine, based on the at least two pieces of same second quality information, that the communication on the first downlink resource fails.

In one embodiment, the $N_1$ pieces of second quality information include at least one lowest-value second quality information, and the at least one lowest-value second quality information is used to indicate the beam that is determined by the terminal device and that is used to restore the communication between the terminal device and the network device, or the at least one lowest-value second quality information is used to indicate quality information of the reference signal resource detected by the terminal device in the candidate reference signal resource set, where the channel quality of the reference signal carried on the reference signal resource is higher than the preset threshold; and the processing module 520 is further configured to:

determine, based on the at least one lowest-value second quality information, that the communication on the first downlink resource fails.

In one embodiment, the $N_1$ pieces of second index information include any two pieces of same second index information, and the any two pieces of same second index information are used to indicate the beam that is determined by the terminal device and that is used to restore the communication between the terminal device and the network device, or the any two pieces of same second index information are used to indicate the index of the reference signal resource detected by the terminal device in the candidate reference signal resource set, where the channel quality of the reference signal carried on the reference signal resource is higher than the preset threshold; and the processing module 520 is further configured to:

determine, based on the any two pieces of same second index information, that the communication on the first downlink resource fails; and/or any two of the $N_1$ pieces of second quality information are the same, and the any two pieces of same second quality information are used to indicate the quality information of the reference signal resource detected by the terminal device in the candidate reference signal resource set, where the channel quality of the reference signal carried on the reference signal resource is higher than the preset threshold, or the any two pieces of same second quality information are used to indicate the beam that is determined by the terminal device and that is used to restore the communication between the terminal device and the network device; and the processing module 520 is further configured to:

determine, based on the any two pieces of same second quality information, that the communication on the first downlink resource fails.

In one embodiment, the first indication information includes $N_2$ pieces of third index information and/or $N_2$ pieces of third quality information, the third index information is used to indicate an index of a third reference signal resource, the third quality information is quality information of a reference signal carried on the third reference signal resource, channel quality of the third quality information is lower than a preset threshold, the third reference signal resource corresponds to a reference signal resource that is associated with control channel spatial QCL configured by the network device for the terminal device, and $N_2$ third reference signal resources indicated by the $N_2$ pieces of third index information belong to a same reference signal resource group, where $N_2$ is a positive integer greater than or equal to 1 and less than or equal to N.

In one embodiment, the $N_2$ pieces of third index information include at least two pieces of same third index information; and the processing module 520 is further configured to:

determine, based on the at least two pieces of same third index information, that the communication on the first downlink resource fails; and/or the $N_2$ pieces of third quality information include at least two pieces of same third quality information; and the processing module 520 is further configured to:

determine, based on the at least two pieces of same third quality information, that the communication on the first downlink resource fails.

In one embodiment, any two of the $N_2$ pieces of third index information are the same; and the processing module 520 is further configured to:

determine, based on the any two pieces of same third index information, that the communication on the first downlink resource fails; and/or the $N_2$ pieces of third quality information are completely the same; and the processing module 520 is further configured to:

determine, based on the any two pieces of same third quality information, that the communication on the first downlink resource fails.

In one embodiment, bits of the $N_2$ pieces of third quality information are special status bits, the special status bit includes either a null indication or a lowest indication bit of quality information, and the processing module 520 is further configured to:

determine, based on the special status bit, that the communication on the first downlink resource fails.

In one embodiment, the first indication information includes first parameter information and second parameter information, the first parameter information includes the $N_1$ pieces of second index information and/or the $N_1$ pieces of second quality information, the second parameter information includes the $N_2$ pieces of third index information and/or the $N_2$ pieces of third quality information, the $N_1$ pieces of second index information includes at least two pieces of same second index information, and the processing module 520 is further configured to:

determine, based on the at least two pieces of same second index information, that the communication on the first downlink resource fails; and/or the $N_1$ pieces of second quality information include at least two pieces of same second quality information; and the processing module 520 is further configured to:

determine, based on the at least two pieces of same second quality information, that the communication on the first downlink resource fails; and/or the $N_2$ pieces of third index information include at least two pieces of same third index information; and the processing module 520 is further configured to:

determine, based on the at least two pieces of same third index information, that the communication on the first downlink resource fails; and/or the $N_2$ pieces of third quality information include at least two pieces of same third quality information; and the processing module 520 is further configured to:

determine, based on the at least two pieces of same third quality information, that the communication on the first downlink resource fails; and/or a bit of at least one of the $N_2$ pieces of third quality information is a special status bit, and the processing module 520 is further configured to:

determine, based on the special status bit, that the communication on the first downlink resource fails, where $N_1+N_2 \leq N$.

In one embodiment, N, $N_1$, and $N_2$ are configured by the network device.

Alternatively, N, $N_1$, and $N_2$ are predefined.

In one embodiment, the transceiver module 510 is further configured to:

send acknowledgment information associated with the first indication information to the terminal device, where the acknowledgment information is used to indicate that the network device correctly receives the first indication information.

It should be understood that the processing module 520 in this embodiment of the present invention may be implemented by a processor or a processor-related circuit component, and the transceiver module 510 may be implemented by a transceiver or a transceiver-related circuit component.

Figure 6:
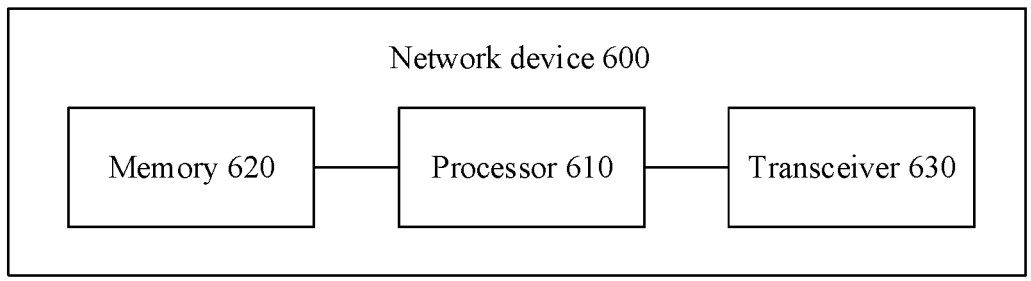
FIG. 6 is another schematic block diagram of a network device according to an embodiment of this application.

As shown in FIG. 6, an embodiment of the present invention further provides a network device 600. The network device 600 includes a processor 610, a memory 620, and a transceiver 630. The memory 620 stores an instruction or a program, and the processor 630 is configured to execute the instruction or the program stored in the memory 620. When the instruction or the program stored in the memory 620 is executed, the processor 610 is configured to perform an operation performed by the processing module 520 in the foregoing embodiment, and the transceiver 630 is configured to perform an operation performed by the transceiver module 510 in the foregoing embodiment.

In this embodiment of the present invention, a security key is used for encryption when a terminal device in an inactive state communicates with a network device, so that communication security can be improved.

It should be understood that, the processor mentioned in the embodiments of the present invention may be a central processing unit (CPU), the processor may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It may be understood that the memory mentioned in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (Dynamic RAM, DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, discrete gate, transistor logic device, or discrete hardware component, the memory (storage module) is integrated into the processor.

It should be noted that the memory described in this specification is intended to include but is not limited to these memories and any other proper type of memory.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information indication method, comprising:
   determining, by a terminal device, that a first beam of a plurality of beams on a first downlink resource fails, wherein the first downlink resource is a resource configured by a network device for the terminal device, wherein each of the plurality of beams is configured to transmit data between the terminal device and the network device in a beamforming communication system;
   identifying, by the terminal device, a first uplink resource that has been allocated by the network device to the terminal device to carry second indication information, wherein the second indication information does not indicate a failure of any of the plurality of beams configured for transmitting information data; and
   reusing, by the terminal device, the first uplink resource to send first indication information to the network device, wherein the first indication information is used to indicate that communication on the first downlink resource fails, wherein lengths of respective information bits of the second indication information and the first indication information are the same, but status bits of the respective information bits of the first indication information and the second indication information are different, wherein the first indication information comprises $N_1$ pieces of second index information and $N_1$ pieces of second quality information, wherein the second index information is used to indicate an index of a second reference signal resource, and includes quality information of a reference signal carried on the second reference signal resource, and wherein $N_1$ second reference signal resources indicated by the $N_1$ pieces of second index information belong to a same reference signal resource group, and wherein $N_1$ is a positive integer greater than 1 and less than or equal to N, wherein the $N_1$ pieces of second index information comprise at least two pieces of same second index information that are used to indicate that the communication on the first downlink resource fails.

2. The method according to claim 1, wherein the first uplink resource includes a periodic or semi-persistent physical uplink control channel PUCCH resource.

3. The method according to claim 1, wherein the second indication information includes beam state information periodically or semi-persistently reported by the terminal device, wherein the beam state information comprises at least one of N pieces of first index information or N pieces of first quality information, wherein the first index information is used to indicate an index of a first reference signal resource, wherein the first quality information includes quality information of a reference signal carried on the first reference signal resource, wherein the first reference signal resource is used for a beam measurement, and wherein N is a positive integer greater than or equal to 1.

4. The method according to claim 3, wherein the N pieces of first index information belong to a same reference signal resource group or belong to M reference signal resource groups, and wherein at least one of any two of the N pieces of first index information are different or indexes of any two of the M reference signal resource groups are different, and wherein M is an integer greater than 1 and less than or equal to N.

5. The method according to claim 1, wherein the second reference signal resource is associated with a second beam of the plurality of beams that is determined by the terminal device and that is used to restore the communication between the terminal device and the network device; or
   the second reference signal resource corresponds to a reference signal resource detected by the terminal device in a candidate reference signal resource set, wherein channel quality of a reference signal carried on the reference signal resource is higher than a preset threshold.

6. The method according to claim 1, wherein
   the at least two pieces of the same second index information are used to indicate a second beam of the plurality of beams that is determined by the terminal device and that is used to restore the communication between the terminal device and the network device, or
   the at least two pieces of the same second index information are used to indicate an index of a reference signal resource detected by the terminal device in a candidate reference signal resource set, and wherein channel quality of a reference signal carried on the reference signal resource is higher than a preset threshold.

7. The method according to claim 1, wherein the $N_1$ pieces of second quality information comprise at least two pieces of same second quality information, and wherein at least one of the at least two pieces of the same second quality information are used to indicate that the communication on the first downlink resource fails, or
   the at least two pieces of the same second quality information are used to indicate information about a second beam of the plurality of beams that is determined by the terminal device and that is used to restore the communication between the terminal device and the network device, or
   the at least two pieces of the same second quality information are used to indicate quality information of a reference signal resource detected by the terminal device in a candidate reference signal resource set, and wherein channel quality of a reference signal carried on the reference signal resource is higher than a preset threshold.

8. The method according to claim 1, wherein the $N_1$ pieces of second quality information comprise at least one piece of lowest-value second quality information, and wherein at least one of the at least one piece of the lowest-value second quality information is used to indicate that the communication on the first downlink resource fails, or the at least one piece of the lowest-value second quality information is used to indicate information about a second beam of the plurality of beams that is determined by the terminal device and that is used to restore the communication between the terminal device and the network device, or the at least one piece of the lowest-value second quality information is used to indicate quality information of a reference signal resource detected by the terminal device in a candidate reference signal resource set, and wherein channel quality of a reference signal carried on the reference signal resource is higher than a preset threshold.

9. The method according to claim 6, wherein any two of the $N_1$ pieces of second index information are the same, and wherein at least one of:

the any two pieces of same second index information are used to indicate that the communication on the first downlink resource fails, and the any two pieces of the same second index information are used to indicate the second beam that is determined by the terminal device and that is used to restore the communication between the terminal device and the network device, or the any two pieces of the same second index information are used to indicate the index of the reference signal resource detected by the terminal device in the candidate reference signal resource set, and wherein the channel quality of the reference signal carried on the reference signal resource is higher than the preset threshold; or any two of the $N_1$ pieces of second quality information are the same, and wherein at least one of the any two pieces of same second quality information are used to indicate that the communication on the first downlink resource fails, and the any two pieces of the same second quality information are used to indicate the information about the second beam that is determined by the terminal device and that is used to restore the communication between the terminal device and the network device, or the any two pieces of the same second quality information are used to indicate the quality information of the reference signal resource detected by the terminal device in the candidate reference signal resource set, and wherein the channel quality of the reference signal carried on the reference signal resource is higher than the preset threshold.

10. A terminal device, comprising:
a memory;
a processor coupled to the memory that is configured to determine that a first beam of a plurality of beams on a first downlink resource fails, wherein the first downlink resource is a resource configured by a network device for the terminal device, wherein each of the plurality of beams is configured to transmit data between the terminal device and the network device in a beamforming communication system, and identify a first uplink resource that has been allocated by the network device to the terminal device to carry second indication information, wherein the second indication information does not indicate a failure of any of the plurality of beams configured for transmitting information data; and a transceiver coupled to the processor that is configured to send first indication information to the network device, wherein the first indication information is used to indicate that communication on the first downlink resource fails, wherein lengths of respective information bits of the second indication information and the first indication information are the same, but status bits of the respective information bits of the first indication information and the second indication information are different, wherein the first indication information comprises $N_1$ pieces of second index information and $N_1$ pieces of second quality information, wherein the second index information is used to indicate an index of a second reference signal resource, and includes quality information of a reference signal carried on the second reference signal resource, and wherein $N_1$ second reference signal resources indicated by the $N_1$ pieces of second index information belong to a same reference signal resource group, and wherein $N_1$ is a positive integer greater than 1 and less than or equal to N, wherein the $N_1$ pieces of second index information comprise at least two pieces of same second index information that are used to indicate that the communication on the first downlink resource fails.

11. The terminal device according to claim 10, wherein the first uplink resource includes a periodic or semi-persistent physical uplink control channel PUCCH resource.

12. The terminal device according to claim 10, wherein the second indication information includes beam state information periodically or semi-persistently reported by the terminal device, wherein the beam state information comprises N pieces of first index information and/or N pieces of first quality information, wherein the first index information is used to indicate an index of a first reference signal resource, wherein the first quality information includes quality information of a reference signal carried on the first reference signal resource, wherein the first reference signal resource is used for a beam measurement, and wherein N is a positive integer greater than or equal to 1.

13. The terminal device according to claim 10, wherein the N pieces of first index information belong to a same reference signal resource group or belong to M reference signal resource groups, and wherein at least one of any two of the N pieces of first index information are different or indexes of any two of the M reference signal resource groups are different, and wherein M is an integer greater than 1 and less than or equal to N.

14. The terminal device according to claim 10, wherein the second reference signal resource is associated with a second beam of the plurality of beams that is determined by the terminal device and that is used to restore the communication between the terminal device and the network device; or the second reference signal resource corresponds to a reference signal resource detected by the terminal device in a candidate reference signal resource set, wherein channel quality of a reference signal carried on the reference signal resource is higher than a preset threshold.

15. The terminal device according to claim 10, wherein the at least two pieces of the same second index information are used to indicate a second beam of the plurality of beams that is determined by the terminal device and that is used to restore the communication between the terminal device and the network device, or the at least two pieces of the same second index information are used to indicate an index of a reference signal resource detected by the terminal device in a candidate reference signal resource set, and wherein channel quality of a reference signal carried on the reference signal resource is higher than a preset threshold.

16. The terminal device according to claim 10, wherein the $N_1$ pieces of second quality information comprise at least two pieces of same second quality information, and wherein at least one of the at least two pieces of the same second quality information are used to indicate that the communication on the first downlink resource fails, or the at least two pieces of the same second quality information are used to indicate information about a second beam of the plurality of beams that is determined by the terminal device and that is used to restore the communication between the terminal device and the network device, or the at least two pieces of the same second quality information are used to indicate quality information of a reference signal resource detected by the terminal device in a candidate reference signal resource set, wherein channel quality of a reference signal carried on the reference signal resource is higher than a preset threshold.

17. The terminal device according to claim 10, wherein the $N_1$ pieces of second quality information comprise at least one piece of lowest-value second quality information, and wherein at least one of the at least one piece of the lowest-value second quality information is used to indicate that the communication on the first downlink resource fails, or the at least one piece of the lowest-value second quality information is used to indicate information about a second beam of the plurality of beams that is determined by the terminal device and that is used to restore the communication between the terminal device and the network device, or the at least one piece of the lowest-value second quality information is used to indicate quality information of a reference signal resource detected by the terminal device in a candidate reference signal resource set, wherein channel quality of a reference signal carried on the reference signal resource is higher than a preset threshold.

18. The terminal device according to claim 10, wherein any two of the $N_1$ pieces of second index information are the same, and wherein at least one of:

the any two pieces of same second index information are used to indicate that the communication on the first downlink resource fails, and the any two pieces of the same second index information are used to indicate a second beam of the plurality of beams that is determined by the terminal device and that is used to restore the communication between the terminal device and the network device, or the any two pieces of the same second index information are used to indicate the index of the reference signal resource detected by the terminal device in a candidate reference signal resource set, and wherein channel quality of the reference signal carried on a reference signal resource is higher than a preset threshold; or any two of the $N_1$ pieces of second quality information are the same, and wherein at least one of the any two pieces of same second quality information are used to indicate that the communication on the first downlink resource fails, and the any two pieces of the same second quality information are used to indicate the information about the second beam that is determined by the terminal device and that is used to restore the communication between the terminal device and the network device, or the any two pieces of the same second quality information are used to indicate the quality information of the reference signal resource detected by the terminal device in the candidate reference signal resource set, and wherein the channel quality of the reference signal carried on the reference signal resource is higher than the preset threshold.

* * * * *